(12) United States Patent
Furuta et al.

(10) Patent No.: US 10,647,891 B2
(45) Date of Patent: May 12, 2020

(54) PRESSURE-SENSITIVE ADHESIVE SHEET AND MAGNETIC DISC DEVICE

(71) Applicant: NITTO DENKO CORPORATION, Ibaraki-shi, Osaka (JP)

(72) Inventors: Kenji Furuta, Ibaraki (JP); Akira Hirao, Ibaraki (JP); Tatsuya Suzuki, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 16/355,921

(22) Filed: Mar. 18, 2019

(65) Prior Publication Data

US 2019/0284445 A1 Sep. 19, 2019

(30) Foreign Application Priority Data

Mar. 19, 2018 (JP) ................. 2018-051399

(51) Int. Cl.
| | | |
|---|---|---|
| *G11B 5/012* | (2006.01) | |
| *C09J 7/38* | (2018.01) | |
| *G11B 21/10* | (2006.01) | |
| *C09J 7/20* | (2018.01) | |

(52) U.S. Cl.
CPC ............... *C09J 7/381* (2018.01); *C09J 7/201* (2018.01); *C09J 7/385* (2018.01); *G11B 5/012* (2013.01); *G11B 21/106* (2013.01)

(58) Field of Classification Search
CPC ........ G11B 5/012; G11B 21/106; C09J 7/381; C09J 7/385; C09J 7/201

USPC ......................................................... 360/220
See application file for complete search history.

(56) References Cited

U.S. PATENT DOCUMENTS

| | | | | | |
|---|---|---|---|---|---|
| 3,416,522 | A | * | 12/1968 | Yeremian | A61F 13/00029 602/47 |
| 5,154,974 | A | * | 10/1992 | Norman | C09J 133/06 428/355 R |
| 5,384,341 | A | * | 1/1995 | Itagaki | C08F 299/00 522/111 |
| 5,631,082 | A | * | 5/1997 | Hirose | C09J 201/10 428/343 |
| 5,939,477 | A | * | 8/1999 | Pretzer | C09J 183/02 524/261 |
| 9,058,851 | B1 | * | 6/2015 | Hanke | G11B 33/1486 |
| 2003/0167550 | A1 | * | 9/2003 | Andrews | A41D 27/133 2/53 |

(Continued)

FOREIGN PATENT DOCUMENTS

| | | |
|---|---|---|
| JP | 2014162874 A | 9/2014 |
| JP | 2017014478 A | 1/2017 |

(Continued)

*Primary Examiner* — Allen T Cao
(74) *Attorney, Agent, or Firm* — Hauptman Ham, LLP

(57) ABSTRACT

Provided is a PSA sheet that has a high level of moisture resistance while maintaining good holding power with reduced gas emission. The PSA sheet provided by this invention comprises a moisture-impermeable layer and a PSA layer provided to one face of the moisture-impermeable layer. The PSA layer comprises a polymer A having a weight average molecular weight of $5 \times 10^4$ or higher as a base polymer and a polymer B having a number average molecular weight of 1000 or higher and a weight average molecular weight lower than $5 \times 10^4$.

19 Claims, 3 Drawing Sheets

(56) References Cited

U.S. PATENT DOCUMENTS

| | | | | |
|---|---|---|---|---|
| 2009/0105670 A1* | 4/2009 | Bentley | | A61M 1/0088 604/290 |
| 2010/0003431 A1* | 1/2010 | Raybuck | | B32B 1/02 428/34.2 |
| 2010/0266794 A1* | 10/2010 | Wright | | A61L 15/60 428/35.7 |
| 2011/0054421 A1* | 3/2011 | Hartwell | | A61F 13/02 604/319 |
| 2011/0123799 A1* | 5/2011 | Yasui | | C08F 220/18 428/354 |
| 2013/0194281 A1* | 8/2013 | Chen | | G06F 1/1656 345/501 |
| 2014/0127443 A1* | 5/2014 | Zhou | | C09J 7/21 428/41.8 |
| 2014/0240869 A1 | 8/2014 | Furuta et al. | | |
| 2015/0284596 A1* | 10/2015 | Nakada | | B32B 27/00 428/355 AC |
| 2016/0104515 A1* | 4/2016 | Strange | | G11B 25/043 360/99.18 |
| 2016/0333225 A1* | 11/2016 | Enoki | | C09J 7/29 |
| 2016/0376473 A1 | 12/2016 | Furuta et al. | | |
| 2017/0027514 A1* | 2/2017 | Biederman | | G06F 1/163 |
| 2017/0053678 A1* | 2/2017 | Albrecht | | G11B 25/043 |
| 2017/0175896 A1* | 6/2017 | Cornu | | F16J 15/04 |
| 2017/0233619 A1* | 8/2017 | Nakada | | C08F 297/02 524/272 |
| 2017/0253773 A1 | 9/2017 | Furuta et al. | | |
| 2017/0278739 A1* | 9/2017 | Akutsu | | B32B 7/06 |
| 2017/0292040 A1* | 10/2017 | Aleed | | C09J 7/26 |
| 2018/0066163 A1 | 3/2018 | Furuta et al. | | |
| 2018/0208799 A1* | 7/2018 | Liu | | C08G 77/44 |
| 2018/0298238 A1* | 10/2018 | Koma | | C09J 7/385 |
| 2019/0127610 A1* | 5/2019 | Suzuki | | C09J 7/385 |
| 2019/0206427 A1* | 7/2019 | Furuta | | C09J 7/387 |

FOREIGN PATENT DOCUMENTS

| | | | |
|---|---|---|---|
| JP | 2017160417 A | 9/2017 | |
| WO | WO-2016094395 A1 * | 6/2016 | B32B 7/06 |

* cited by examiner

[Fig. 1]
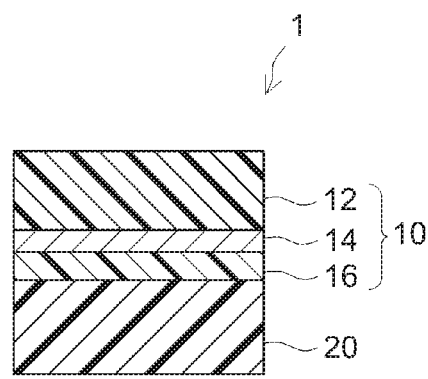
[Fig. 2]
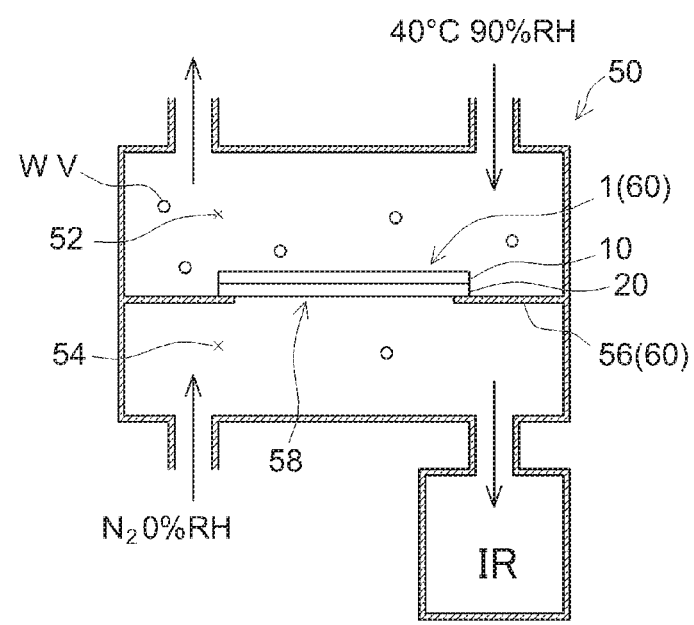

[Fig. 3]
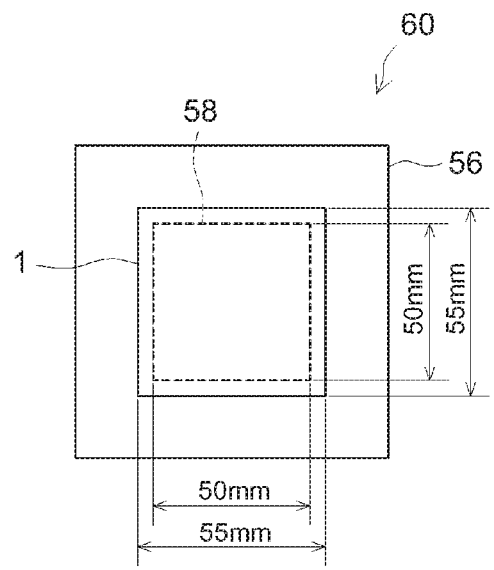
[Fig. 4]
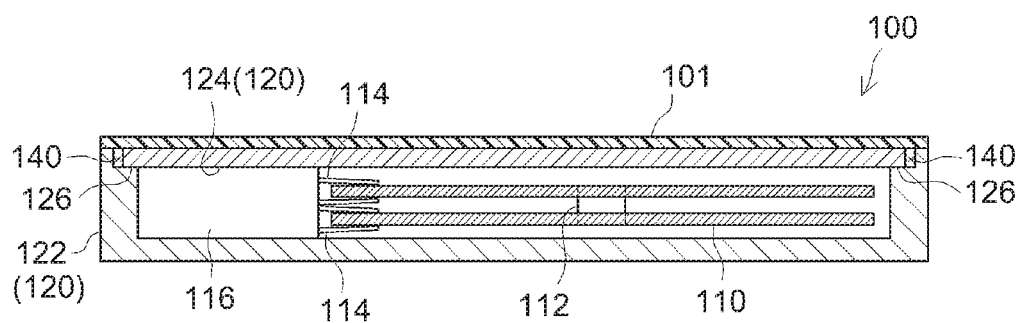

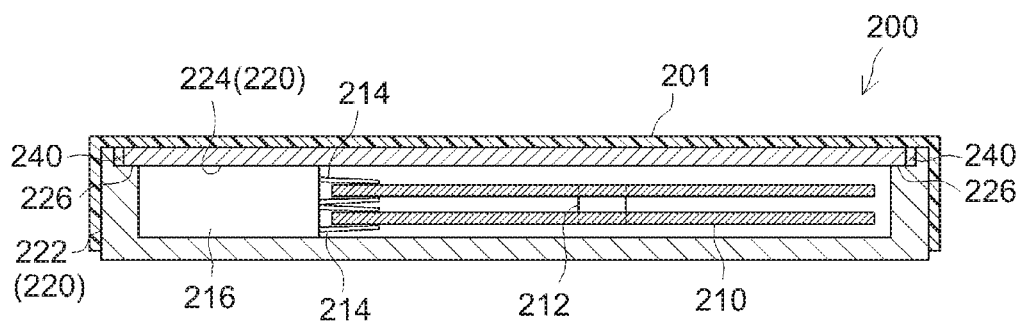
[Fig. 5]

PRESSURE-SENSITIVE ADHESIVE SHEET AND MAGNETIC DISC DEVICE

CROSS-REFERENCE

The present invention claims priority to Japanese Patent Application No. 2018-051399 filed on Mar. 19, 2018; and the entire content thereof is incorporated herein by reference.

BACKGROUND OF THE INVENTION

1. Field of the Invention

The present invention is related to a pressure-sensitive adhesive sheet and a magnetic disc device comprising the pressure-sensitive adhesive sheet.

2. Description of the Related Art

In general, pressure-sensitive adhesive (PSA) exists as a soft solid (a viscoelastic material) in a room temperature range and has a property to adhere easily to an adherend with some pressure applied. For such a property, PSA is widely used in a form of, for instance, an on-substrate PSA sheet having a PSA layer on a support substrate, for purposes such as bonding, fastening, protection and sealing in various applications including electronic devices. For instance, technical literatures related to PSA sheets that air-tightly seal internal spaces of magnetic disc devices include Japanese Patent Application Publication Nos. 2014-162874, 2017-014478 and 2017-160417. In this application, because the allowable maximum temperature is limited, PSA that does not require heat for press-bonding is preferably used as the bonding means.

SUMMARY OF THE INVENTION

For instance, the conventional PSA sheets all comprise non-breathable substrates and are used in magnetic disc devices such as hard disc drives (HDD), in embodiments to seal their internal spaces where magnetic discs (typically HD) are contained. In particular, a void space that can be present between a cover member and a housing base member in which the magnetic disc is placed can be covered and sealed with a PSA sheet so as to obtain air-tightness for the internal space of the device. Such air-tight properties may be essential and particularly important in a type of device whose internal spaces is filled with a low-density gas such as helium in order to reduce the influence of air flow generated by the spinning disc. In an embodiment using the PSA sheet, the sealing structure can be made thinner than in a conventional magnetic disc device for which air-tightness has been assured with a gasket; and therefore, this embodiment is advantageous in increasing the density and capacity of a magnetic disc device. This embodiment does not require use of a liquid gasket. Thus, it can mitigate outgassing (gas emission) problems due to gasket.

Lately, to further increase the capacity, studies are underway on magnetic disc devices using HAMR (heat-assisted magnetic recording). In short, HAMR is a technology that uses a laser beam to increase their surface recording densities. In this technology, the presence of internal moisture attenuates the laser beam and badly impacts on the recording life (the number of times that it can be overwritten). Thus, it is desirable to exclude moisture from HAMR as much as possible. With regard to this, in Japanese Patent Application Publication Nos. 2017-014478 and 2017-106417, the cup method is used to evaluate the moisture permeability of a PSA sheet having an aluminum layer. However, the moisture permeability test of a PSA sheet by the cup method has been unsatisfactory to quantify a minute amount of water vapor transmission which may affect HAMR.

Accordingly to further enhance the water vapor-blocking properties, (or moisture resistance) of PSA sheets, the present inventors have conducted studies including test methods for moisture permeability to identify moisture permeable channels through the PSA sheets and established a novel, effective method for testing moisture permeability (a method for accurately assessing through-bonding-plane moisture permeability i.e. moisture permeability in the in-plane direction of bonding area (bonding interface)). As a result of researching countermeasures for moisture permeation based on the novel test method, a PSA sheet having a high level of moisture resistance capable of extending HAMR life and the like has been successfully developed, whereby the present invention has been completed. In other words, an objective of the present invention is to provide a PSA sheet that has a high level of moisture resistance while maintaining good holding power with reduced gas emission. Another objective of this invention is to provide a magnetic disc device using the PSA sheet.

The present description provides a PSA sheet comprising a moisture-impermeable layer and a PSA layer provided on one face of the moisture-impermeable layer. The PSA layer comprises, a polymer A having a weight average molecular weight (Mw) of $5 \times 10^4$ or higher as a base polymer and a polymer B having a number average molecular weight (Mn) of 1000 or higher and a weight average molecular weight lower than $5 \times 10^4$.

The PSA sheet thus constituted can prevent moisture permeation in the PSA sheet's thickness direction with the moisture-impermeable layer as well as moisture permeation in in-plane directions of bonding area (in directions perpendicular to the thickness direction of the PSA sheet) while maintaining good holding power. In particular, with the use of polymer A (a high-molecular-weight polymer with $Mw \geq 5 \times 10^4$) and polymer B (a low-molecular-weight polymer with $Mw < 5 \times 10^4$) having a Mn of 1000 or higher, while a practical level of holding power is maintained, moisture permeation in in-plane directions of bonding area of PSA layer can be greatly prevented. The use of polymer B with $Mn \geq 1000$ can limit the amount of outgassing as well. For instance, when the PSA sheet disclosed herein is used as a sealing material in a magnetic disc device, while good sealing properties are maintained based on the holding power, it is possible to greatly limit changes (typically increases) in internal humidity that may affect the normal and highly precise operation of the device. In addition, internal gas contamination can also be limited to or below a certain level.

In a preferable embodiment of the PSA sheet disclosed herein, the polymer B has a number average molecular weight of 2000 or higher. In this embodiment, the decrease in holding power can be further reduced while the moisture resistance is further enhanced. The amount of outgassing tends to further decrease as well.

In a preferable embodiment of the PSA sheet disclosed herein, the polymer B is at least one species selected among olefinic polymers and diene-based polymers. With the use of the olefinic polymer and/or diene-based polymer as the polymer B, through its hydrophobic and nonpolar character as well as the effect to prevent moisture permeation based on the molecular weights in the prescribed ranges, excellent moisture resistance can be preferably obtained. In particular, the polymer B is preferably a polybutene.

In a preferable embodiment of the PSA sheet disclosed herein, the polymer A is at least one species selected among rubber-based polymers and acrylic polymers. The use of rubber-based and/or acrylic PSA layer can preferably combine moisture resistance and reduction of gas emission.

In a preferable embodiment of the PSA sheet disclosed herein, the PSA sheet has a through-bonding-plane moisture permeability lower than 30 μg/cm$^2$·24 h when determined at a permeation distance of 2.5 mm based on the MOCON method. The PSA sheet satisfying this feature is highly moisture-resistant; and therefore, it can be preferably used for a purpose for which the presence of moisture is undesired.

In a preferable embodiment, the PSA sheet disclosed herein has an amount of thermally released gas of 10 μg/cm$^2$ or less when determined at 130° C. for 30 minutes by gas chromatography/mass spectrometry (GC-MS). In the PSA sheet satisfying this feature, the amount of thermally released gas is greatly limited; and therefore, internal gas contamination can be greatly limited.

The PSA sheet disclosed herein has good holding power as well as excellent moisture resistance with reduced gas emission. Thus, it is preferably used for sealing the internal space of a magnetic disc device where entry of moisture and gas needs to be limited. The art disclosed herein provides a magnetic disc device comprising a PSA sheet disclosed herein. The PSA sheet may serve to seal the internal space of the magnetic disc device. In the magnetic disc device in such an embodiment, the PSA sheet is relatively thin, yet provides moisture resistance and airtight properties; and therefore, as compared to a conventional gasket-type product, the capacity can be further increased with a lower amount of released gas. In particular, with the use of the PSA sheet disclosed herein in a HAMR magnetic disc device, a magnetic recording device having a higher density can be obtained.

BRIEF DESCRIPTION OF THE DRAWINGS

FIG. 1 shows a cross-sectional diagram schematically illustrating an example of constitution of the PSA sheet.

FIG. 2 shows a schematic diagram illustrating the method for determining the moisture permeability.

FIG. 3 shows an enlarged top view of a sample used in determining the moisture permeability.

FIG. 4 shows a cross-sectional diagram schematically illustrating the magnetic disc device according to an embodiment.

FIG. 5 shows a cross-sectional diagram schematically illustrating the magnetic disc device according to another embodiment.

DETAILED DESCRIPTION OF THE INVENTION

Preferable embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field. In the drawings referenced below, a common reference numeral may be assigned to members or sites producing the same effects, and redundant descriptions are sometimes omitted or simplified. The embodiments described in the drawings are schematized for clear illustration of the present invention, and do not necessarily represent the accurate size or reduction scale of an actual product of the PSA sheet or magnetic disc device of this invention or of the moisture permeability tester.

As used herein, the term "PSA" refers to, as described earlier, a material that exists as a soft solid (a viscoelastic material) in a room temperature range and has a property to adhere easily to an adherend with some pressure applied. As defined in "Adhesion Fundamentals and Practice" by C. A. Dahlquist (McLaren & Sons (1966), P. 143), in general, PSA referred to herein can be a material that has a property satisfying complex tensile modulus E* (1 Hz)<10$^7$ dyne/cm$^2$ (typically, a material that exhibits the described characteristics at 25° C.).

The concept of PSA sheet herein may encompass so-called PSA tape, PSA labels, PSA film, etc. The PSA sheet disclosed herein can be in a roll or in a flat sheet. Alternatively, the PSA sheet may be processed into various shapes.
<Constitution of PSA Sheet>

The PSA sheet disclosed herein can be, for instance, an adhesively single-faced PSA sheet having a cross-sectional structure as shown in FIG. 1. A PSA sheet 1 comprises a moisture-impermeable layer 10 and a PSA layer 20 supported on a first face of moisture-impermeable layer 10. In particular, moisture-impermeable layer 10 is a layered body (laminate film) in which a first resin layer 12, an inorganic layer 14 and a second resin layer 16 are layered in this order. The first resin layer 12 placed on the first face side of inorganic layer 14 forms an outer surface of PSA sheet 1 while the second resin layer 16 is placed on the second face side of inorganic layer 14, that is, the PSA layer 20 side. From the standpoint of the moisture resistance, PSA layer 20 is formed continuously over the entire first face of moisture-impermeable layer 10 at least in the area that bonds to an adherend. PSA sheet 1 prior to use (before applied to the adherend) may be protected with a release liner (not shown in the drawing) having a release face at least on the PSA layer 20 side surface.
<PSA Layer>
(Polymer A)

In the art disclosed herein, the type of PSA forming the PSA layer is not particularly limited. The PSA may comprise, as its base polymer (polymer A), one, two or more species of various rubber-like polymers such as rubber-based polymers, acrylic polymers, polyester-based polymers, urethane-based polymers, polyether-based polymers, silicone-based polymers, polyamide-based polymer and fluorine-based polymers that are known in the PSA field from the standpoint of the moisture resistance and reduction of outgassing, it is preferable to use a rubber-based PSA comprising a rubber-based polymer as the polymer A for a PSA comprising an acrylic polymer as the polymer A. Other examples include a PSA comprising a rubber-based polymer and an acrylic polymer as the polymer A. In particular, a highly moisture-resistant rubber-based PSA layer is more preferable. When the PSA sheet disclosed herein is used in a magnetic disc device, it is desirable that the PSA is essentially free of a silicone-based polymer which may form siloxane gas.

The PSA sheet having a rubber-based PSA layer and the PSA sheet having an acrylic PSA layer are primarily discussed below; however, the PSA layer of the PSA sheet disclosed herein is not limited to a layer formed of a rubber-based PSA or an acrylic PSA.

As used herein, the "base polymer" of a PSA layer refers to one, two or more species of rubber-like polymer with $Mw \geq 5 \times 10^4$ forming the PSA layer (polymer that shows rubber elasticity in a room temperature range), with the polymer component(s) accounting for about at least 30% (typically at least about 40%, e.g. at least about 50%) by weight of the PSA layer.

(Rubber-Based Polymer)

The PSA layer disclosed herein is preferably a rubber-based PSA layer formed from a PSA composition that comprises a rubber-based polymer as the polymer A. Examples of the rubber-based polymer include various rubber-based polymers such as natural rubber; styrene-butadiene rubber (SBR); polyisoprene; a butene-based polymer comprising butene (referring to 1-butene as well as cis- or trans-2-butene) and/or 2-methylpropene (isobutylene) as the primary monomer(s); A-B-A block copolymer rubber and a hydrogenation product thereof, for instance, styrene-butadiene-styrene block copolymer rubber (SBS), styrene-isoprene-styrene block copolymer rubber (SIS), styrene-isobutylene-styrene block copolymer rubber (SIBS), styrene-vinyl isoprene-styrene block copolymer rubber (SVIS), styrene-ethylene-butylene-styrene block copolymer rubber (SEBS) which is a hydrogenation product of SBS, styrene-ethylene-propylene-styrene block copolymer rubber (SEPS) which is a hydrogenation product of SIS, and styrene-isoprene-propylene-styrene block copolymer (SIPS). Among these rubber-based polymers, solely one species or a combination of two or more species can be used.

A favorable example of the butene-based polymer is an isobutylene-based polymer. Due to its molecular structure, the isobutylene-based polymer is highly hydrophobic and its main chain has low motility. Thus, a PSA layer (isobutylene-based PSA layer) whose base polymer is an isobutylene-based polymer may itself show a relatively low moisture permeability. This is also advantageous from the standpoint of preventing lateral entry of water vapor into the PSA layer at an edge face of the PSA sheet. Such a PSA layer tends to have a good elastic modulus and excellent removability. Specific examples of the isobutylene-based polymer include polyisobutylene and isobutylene-isoprene copolymer (butyl rubber).

The monomers (monomer mixture) to form the rubber-based polymer disclosed herein comprises one, two or more species of monomers selected among butene, isobutylene, isoprene, butadiene, styrene, ethylene and propylene. The rubber-based polymer can be a polymer obtainable by polymerizing the one, two or more species of monomers exemplified above. The monomer mixture for forming the rubber-based polymer disclosed herein typically comprises the one, two or more species of monomers at a ratio of at least 50% (e.g. 50% to 100%) by weight, preferably at least 75% by weight, more preferably at least 85% by weight, or yet more preferably at least 90% (e.g. at least 95%) by weight. The ratio of these monomers in the entire monomer content can also be 99% by weight or higher. The rubber-based polymer can be obtained by copolymerizing one, two or more species of other monomers copolymerizable with these monomers listed as the examples. The rubber-based polymer according to a preferable embodiment is a polymer obtainable by polymerizing one, two or more species of monomers selected among isobutylene, isoprene and butene. It is noted that from the standpoint of reduction of outgassing (in particular, reduction of gas emission that may degrade the durability, reliability or accurate operation of electronic devices including magnetic disc devices), the styrene content of the monomer mixture is preferably lower than 10% by weight, or more preferably lower than 1% by weight. The art disclosed herein can be preferably implemented in an embodiment where the monomer mixture is essentially free of styrene.

In a preferable embodiment of the PSA sheet disclosed herein, the isobutylene-based polymer accounts for more than 50% (e.g. 70% or more, or even 85% or more) by weight of the base polymer(s) in the PSA. The PSA may be essentially free of other polymers besides the isobutylene-based polymer. In the PSA for instance, the ratio of non-isobutylene-based polymer content in the polymer content can be 1% by weight or lower, or at or below the minimum detectable level.

As used herein, the "isobutylene-based polymer" is not limited to isobutylene homopolymer (homopolyisobutylene) and the term encompasses a copolymer whose primary monomer is isobutylene. The copolymer includes a copolymer in which isobutylene corresponds to the highest content of the monomers forming the isobutylene-based polymer. In typical, it can be a copolymer in which isobutylene accounts for more than 50% by weight of the monomers, or even 70% by weight or more thereof. Examples of the copolymer include a copolymer of isobutylene and butene (normal butylene), a copolymer (butyl rubber) of isobutylene and isoprene, vulcanized products and modified products of these. Examples of the copolymers include butyl rubbers such as regular butyl rubber, chlorinated butyl rubber, iodinated butyl rubber, and partially crosslinked butyl rubber. Examples of the vulcanized and modified products include those modified with functional groups such as hydroxy group, carboxy group, amino group, and epoxy group. The isobutylene-based polymer that can be preferably used from the standpoint of the moisture resistance, reduction of outgassing, and adhesive strength, etc., includes polyisobutylene and isobutylene-isoprene copolymer (butyl rubber). The copolymer can be a copolymer (e.g. an isobutylene-isoprene copolymer) of which the other monomers (isoprene, etc.) excluding isobutylene has a copolymerization ratio lower than 30% by mol.

As used herein, the "polyisobutylene" refers to a polyisobutylene in which the copolymerization ratio of monomers excluding isobutylene is 10% or lower (preferably 5% or lower) by weight.

For the isobutylene-based polymer, it is possible to suitably select and use a species having a weight average molecular weight (Mw) of suitably about $5 \times 10^4$ or higher, preferably about $15 \times 10^4$ or higher, more preferably about $30 \times 10^4$ or higher, or yet more preferably about $45 \times 10^4$ or higher (e.g. about $50 \times 10^4$ or higher). The maximum Mw is not particularly limited and can be about $150 \times 10^4$ or lower (preferably about $100 \times 10^4$ or lower, e.g. about $80 \times 10^4$ or lower). Several species of isobutylene-based polymer varying in Mw can be used together as well. Having a Mw in these ranges, the PSA can be easily adjusted to have an elasticity in a preferable range and is likely to show good cohesive strength.

While no particular limitations are imposed, as the polyisobutylene, it is possible to preferably use a species having a dispersity (Mw/Mn) (which is indicated as a ratio of weight average molecular weight (Mw) to number average molecular weight (Mn)) in a range of 3 to 7 (more preferably 3 to 6, e.g. 3.5 to 5.5). Several species of polyisobutylene varying in Mw/Mn can be used together as well.

The Mw and Mn values of an isobutylene-based polymer here refer to values based on standard polystyrene that are determined by gel permeation chromatography (GPC) analysis. As the GPC analyzer, for instance, model name HLC-8120 GPC available from Tosoh Corporation can be used.

As the butyl rubber, a species with Mw≥5×10$^4$ can be suitably selected and used. In view of the balance between the PSA layer's ease of formation and tightness of bonding to adherend (adhesive strength), the butyl rubber's Mw is preferably about 10×10$^4$ or higher, more preferably about 15×10$^4$ or higher, yet more preferably about 30×10$^4$ or higher, or particularly preferably about 45×10$^4$ or higher (e.g. about 50×10$^4$ or higher); it is preferably 100×10$^4$ or lower, or more preferably 80×10$^4$ or lower. Several species of butyl rubber varying in Mw can be used together as well.

While no particular limitations are imposed, the butyl rubber has a dispersity (Mw/Mn) in a range of preferably 3 to 8 or more preferably in a range of 4 to 7. Several species of butyl rubber varying in Mw/Mn can be used together as well. The butyl rubber's Mw and Mn can be determined by GPC analysis, similarly to the polyisobutylene.

The Mooney viscosity of the butyl rubber is not particularly limited. For instance, a butyl rubber having a Mooney viscosity $ML_{1+8}$(125° C.) between 10 and 100 can be used. In view of the balance between the PSA layer's ease of formation and tightness of bonding to adherend (adhesive strength), a butyl rubber having a Mooney viscosity $ML_{1+8}$(125° C.) of 15 to 80 (more preferably 30 to 70, e.g. 40 to 60) is preferable.

In a preferable embodiment of the art disclosed herein, the PSA layer comprises a rubber-based polymer A1 and a rubber-based polymer A2 as its base polymers. The rubber-based polymers A1 and A2 are preferably both isobutylene-based polymers. The rubber-based polymer A1 according to a more preferable embodiment is an isobutylene-based polymer in which isobutylene is polymerized at a ratio of at least 50% (e.g. at least 70%, preferably at least 80%, or yet more preferably at least 90%) by weight; it is typically polyisobutylene. The rubber-based polymer A2 is an isobutylene-based polymer in which isobutylene and isoprene are copolymerized (i.e. an isobutylene-based copolymer); it is typically au isobutylene-isoprene copolymer. In the copolymer, the combined amount of isobutylene and isoprene as monomers accounts for typically at least 50% (e.g. at least 70%, preferably at least 80%, or yet more preferably at least 90%) by weight of the entire monomers. The use of rubber-based polymers A1 and A2 can bring the PSA layer's elastic modulus in a preferable range and greater moisture resistance can be obtained.

When rubber-based polymers A1 and A2 are used, their blend ratio can be suitably selected so as to obtain preferable elastic modulus, moisture resistance and adhesive properties disclosed herein. The weight ratio ($P_{A1}/P_{A2}$) of rubber-based polymer A1 ($P_{A1}$) to rubber-based polymer A2 ($P_{A2}$) can be, for instance, 95/5 to 5/95, preferably 90/10 to 10/90, more preferably 80/20 to 20/80, yet more preferably 70/30 to 30/70, or particularly preferably 60/40 to 40/60.

In a preferable embodiment, the dispersity (Mw/Mn) of the aforementioned base polymers at large is 3 or higher, or more preferably 4 or higher. According to the PSA comprising such base polymers, adhesive strength can be easily combined with resistance to leftover adhesive residue. It also brings the PSA layer's elastic modulus in a favorable range and good moisture resistance tends to be obtained. At or above a certain Mw/Mn value, the PSA can be obtained with a low solution viscosity for its Mw. The dispersity of the base polymers at large can also be 5 or higher, 6 or higher, or even 7 or higher. The maximum dispersity of the base polymers at large is not particularly limited; it is preferably 10 or lower (e.g. 8 or lower).

The art disclosed herein can be preferably implemented in an embodiment having a PSA layer (e.g. a rubber-based PSA layer) formed of a PSA (a non-crosslinked PSA) in which the based polymers are not crosslinked. Here, the term "PSA layer formed of a non-crosslinked PSA" refers to a PSA layer that has not been subjected to an intentional treatment (i.e. crosslinking treatment, e.g. addition of a crosslinking agent, etc.) for forming chemical bonds among the base polymers.

(Acrylic Polymer)

In an embodiment of the art disclosed herein, the PSA layer is an acrylic PSA layer comprising an acrylic polymer as the polymer A. The acrylic polymer is preferably a polymer of a starting monomer mixture that comprises an alkyl (meth)acrylate as the primary monomer and may further comprise a secondary monomer copolymerizable with the primary monomer. Here, the primary monomer refers to a component accounting for more than 50% by weight of the starting monomer mixture.

As used herein, the term "(meth)acryloyl" comprehensively refers to acryloyl and methacryloyl. Similarly the term "(meth)acrylate" comprehensively refers to acrylate and methacrylate, and the term "(meth)acryl" comprehensively refers to acryl and methacryl.

As the alkyl (meth)acrylate, for instance, a compound represented by the following formula (1) can preferably be used:

$$CH_2=C(R^1)COOR^2 \qquad (1)$$

Here, $R^1$ in the formula (1) is a hydrogen atom or a methyl group. $R^2$ is an acyclic alkyl group having 1 to 20 carbon atoms (hereinafter, such a range of the number of carbon atoms may be indicated as "$C_{1-20}$"). From the standpoint of the PSA's storage modulus, adhesive properties, etc., an alkyl (meth)acrylate in which $R^2$ is a $C_{1-18}$ acyclic alkyl group is preferable; an alkyl (meth)acrylate in which $R^2$ is a $C_{2-14}$ acyclic alkyl group is more preferable; an alkyl (meth)acrylate in which $R^2$ is a $C_{4-12}$ acyclic alkyl group is even more preferable. In particular, it is preferable to use an alkyl acrylate as the primary monomer. The acyclic alkyl group includes linear and branched alkyl groups. For the alkyl (meth)acrylate, solely one species or a combination of two or more species can be used.

From the standpoint of the moisture resistance, as the primary monomer forming the acrylic polymer, it is preferable to use an alkyl (meth)acrylate having a higher number of carbon atoms in the acyclic alkyl group. With increasing number of carbon atoms of side-chain alkyl group in the acrylic polymer, the polymer tends to have higher hydrophobicity and greater moisture resistance. The number of carbon atoms in the acyclic alkyl group is 2 or higher, preferably 4 or higher, more preferably 8 or higher, yet more preferably 9 or higher, or particularly preferably 12 or higher.

The ratio of alkyl (meth)acrylate as the primary monomer in all the monomers forming the acrylic polymer is preferably 60% by weight or higher, more preferably 70% by weight or higher, or more preferably 75% by weight or higher (e.g. 85% by weight or higher). The maximum alkyl (meth)acrylate content is not particularly limited; it is preferably 95% by weight or lower (e.g. by weight or lower).

Secondary monomers capable of introducing possible crosslinking points into the acrylic polymer or enhancing the adhesive strength include hydroxy group-containing monomers (e.g. 2-hydroxyethyl (meth)acrylate, 4-hydroxybutyl (meth)acrylate, etc.), carboxy group-containing monomers (e.g. acrylic acid, methacrylic acid, etc.), acid anhydride group-containing monomers, amide group-containing monomers, amino group-containing monomers, imide group-containing monomers, epoxy group-containing monomers, (meth)acryloylmorpholine, and vinyl ethers. Among them, hydroxy group-containing monomers and carboxy group-containing monomers are preferable. Hydroxy group-containing monomers are more preferable. For the secondary monomer, solely one species or a combination of two or more species can be used.

When the monomers forming the acrylic polymer comprises a functional group-containing monomer, from the standpoint of the cohesive strength, etc., the ratio of the functional group-containing monomer in the monomers is suitably 0.1% by weight or higher, preferably 1% by weight or higher, or more preferably 3% by weight or higher. The upper limit is preferably 30% by weight or lower (e.g. 25% by weight or lower).

As the monomers forming the acrylic polymer, for a purpose such as increasing the cohesive strength of the acrylic polymer, other comonomers can be used besides the aforementioned secondary monomers. Examples of the comonomers include vinyl ester-based monomers such as vinyl acetate; aromatic vinyl compounds such as styrene; cycloalkyl (meth)acrylates such as cyclohexyl (meth)acrylate; aromatic ring-containing (meth)acrylates such as aryl (meth)acrylates; olefinic monomers such as ethylene, propylene, isoprene, butadiene and isobutylene; polyfunctional monomers such as 1,6-hexanediol di(meth)acrylate, having two or more (e.g. three or more) polymerizable functional groups (e.g. (meth)acryloyl groups) per molecule. The amount of the other comonomers can be suitably selected in accordance to the purpose and application and is not particularly limited. It is preferably 10% by weight or less (e.g. 1% by weight or less) of the monomers.

The composition of the monomers forming the acrylic polymer suitably designed so that the acrylic polymer has a glass transition temperature (Tg) in a prescribed range.

Here, the Tg of the acrylic polymer refers to the value determined by the Fox equation based on the composition of the monomers. As shown below, the Fox equation is a relational expression between the Tg of a copolymer and glass transition temperatures Tgi of homopolymers of the respective monomers constituting the copolymer.

$$1/Tg=\Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i. As the glass transition temperatures of homopolymers used for determining the Tg value, values found in publicly known documents are used. For instance, values given in "Polymer Handbook" (3rd edition, John Wiley & Sons, Inc., Year 1989) can be used. When the literature provides two or more values for a certain monomer, the highest value is used.

While no particular limitations are imposed, from the standpoint of the adhesion, the acrylic polymer's Tg is advantageously about 0° C. or lower, or preferably about −5° C. or lower (e.g. about −15° C. or lower, or −25° C. or lower). From the standpoint of the PSA layer's cohesive strength, the acrylic polymer's Tg is about −75° C. or higher, or preferably about −70° C. or higher (e.g. −50° C. or higher, or even −30° C. or higher). The acrylic polymer's Tg can be adjusted by suitably changing the monomer composition (i.e. the monomer species used for synthesizing the polymer and their ratio).

The acrylic polymer's Mw is not particularly limited. For instance, it can be about $10\times10^4$ or higher and $500\times10^4$ or lower. From the standpoint of the cohesion, the Mw is about $30\times10^4$ or higher and suitably about $45\times10^4$ or higher (e.g. about $65\times10^4$ or higher). In a preferable embodiment, the acrylic Mw is $70\times10^4$ or higher, more preferably about $90\times10^4$ or higher, or yet more preferably about $110\times10^4$ or higher. The Mw is suitably $300\times10^4$ or lower (more preferably about $200\times10^4$ or lower, e.g. about $150\times10^4$ or lower).

It is noted that Mw is determined from a value obtained based on standard GPC by GPC. As the analyzer, for instance, model name HLC-8320 GPC (columns: TSKgel GMH-H(S) available from Tosoh Corporation) can be used.

The method for obtaining the acrylic polymer is not particularly limited. Various polymerization methods known as synthetic methods of acrylic polymers may be appropriately employed, such as solution polymerization, emulsion polymerization, bulk polymerization, suspension polymerization and photopolymerization. For instance, solution polymerization may be preferably employed. As the method for supplying the monomers when solution polymerization is carried out, all-at-once supply by which all starting monomers are supplied at once, continuous supply (addition), portion-wise supply (addition) and like method can be suitably employed. For the solvent (polymerization solvent) used for solution polymerization, a suitable species can be selected among heretofore known organic solvents (e.g. toluene and ethyl acetate). The polymerization temperature can be appropriately selected according to the species of monomers, solvent, and polymerization initiator used, etc. It can be, for instance, about 20° C. to 170° C. (typically about 40° C. to 140° C.). In a preferable embodiment, the polymerization temperature can be about 75° C. or lower (more preferably about 65° C. or lower, e.g. about 45° C. to 65° C.).

The initiator used in the polymerization can be suitably selected among heretofore known polymerization initiators in accordance with the polymerization method. For instance, one, two or more species of azo-based polymerization initiator can be preferably used, such as 2,2'-azobisisobutylonitrile (AIBN). In radical polymerization, as compared to organic peroxides and other radial polymerization initiators, it is advantageous to use an azo-based polymerization initiator as its degradation products are unlikely to remain in the resulting PSA composition as components that can be thermally released as gas and outgassing is likely to be inhibited. Other examples of polymerization initiator include peroxide-based initiators such as benzoyl peroxide (BPO) and hydrogen peroxide. Other polymerization initiators include persulfates such as potassium persulfate; substituted ethane-based initiators such as phenyl-substituted ethane; aromatic carbonyl compounds; and redox-based initiators by a combination of a peroxide and a reducing agent. Among these polymerization initiators, solely one species or a combination of two or more species can be used. The polymerization initiator can be used in a typical amount selected from a range of, for instance, about 0.005 part to 1 part (typically about 0.01 part to 1 part) by weight to 100 parts by weight of the monomers.

(Blend of Acrylic Polymer and Rubber-Based Polymer)

The PSA layer according to an embodiment of the art disclosed herein is a rubber-acrylic blend PSA layer comprising a rubber-based polymer and an acrylic polymer as the polymer A. As the rubber-based polymer, one, two or more species can be used among the aforementioned rubber-based polymers. As the acrylic polymer one, two or more species can be used among the aforementioned acrylic polymers. The rubber-based polymer and acrylic polymer can be suitably mixed together to preferably combine the rubber-based polymers advantage (moisture resistance, etc.) and acrylic polymers advantage (low level of outgassing, adhesive properties, etc.). When a rubber-based polymer and an acrylic polymer are used together as the polymer A, the weight ratio of rubber-based polymer (R) to acrylic polymer (A), R/A, can be, for instance, 95/5 to 20/80; it is preferably 90/10 to 30/70, more preferably 80/20 to 40/60, or yet more preferably 70/30 to 50/50.

(Crosslinking Agent)

The PSA composition (preferably a solvent-based PSA composition) used for forming the PSA layer preferably comprises a crosslinking agent as an optional component. The PSA layer (e.g. an acrylic PSA layer) in the art disclosed herein may include the crosslinking agent in a post-crosslinking-reaction form, a pre-crosslinking-reaction form, a partially-crosslinked form, an intermediate or combined form of these, etc. In typical, the crosslinking agent is mostly included in the post-crosslinking-reaction form.

The type of crosslinking agent is not particularly limited. A suitable species can be selected and used among heretofore known crosslinking agents. Examples of the crosslinking agent, include isocyanate-based crosslinking agents, epoxy-based crosslinking agents, oxazoline-based crosslinking agents, aziridine-based crosslinking agents, melamine-based crosslinking agents, carbodiimide-based crosslinking agents, hydrazine-based crosslinking agents, amine-based crosslinking agents, peroxide-based crosslinking agents, metal chelate-based crosslinking agents, metal alkoxide-based crosslinking agents, and metal salt-based crosslinking agents. For the crosslinking agent, solely one species or a combination of two or more species can be used. Examples of the crosslinking agent that can be preferably used in the art disclosed herein include isocyanate-based crosslinking agents and epoxy-based crosslinking agents. In particular, isocyanate-based crosslinking agents are more preferable.

The crosslinking agent content in the PSA composition disclosed herein is not particularly limited. From the standpoint of the cohesion, to 100 parts by weight of the base polymer (e.g. acrylic polymer), it is suitably about 0.001 part by weight or more, preferably about 0.002 part by weight or more, more preferably about 0.005 part by weight or more, or yet more preferably about 0.01 part by weight or more. From the standpoint of the adhesive strength and elastic modulus, the crosslinking agent content in the PSA composition is, to 100 parts by weight of the base polymer (e.g. acrylic polymer), about 20 parts by weight or less, suitably about 15 parts by weight or less, or preferably about 10 parts by weight or less (e.g. about 5 parts by weight or less).

(Polymer B)

The art disclosed herein is characterized by the PSA layer comprising a polymer B in addition to the polymer A. The polymer B is a polymer different from the polymer A, having a lower molecular weight than the polymer A. In terms of the molecular weight, Mw is used for comparison to the polymer A. The polymer B is characterized by having a Mn of 1000 or higher. This can greatly prevent moisture permeation in in-plane directions of bonding area of the PSA layer while maintaining a practical level of holding power. In addition, the amount of outgassing can be limited as well. From the standpoint of enhancing the moisture resistance, maintaining the holding power and reducing outgassing, the Mn is preferably 2000 or higher, or more preferably 2500 or higher.

The polymer B's molecular weight is lower than that of the polymer A, having a Mw typically below $5 \times 10^4$. From the standpoint of the moisture resistance, the polymer B's Mw can also be below about $1 \times 10^4$, or even about 5000 or lower. The polymer B according to an embodiment is liquid or a viscous fluid at room temperature (e.g. 25° C.).

As the polymer B's Mn, a value determined by vapor pressure osmometry is used. The polymer B's Mw refers to the value based on standard polystyrene determined by GPC analysis. As the GPC analyzer, for instance, model name HLC-8120 GPC available from Tosoh Corporation can be used.

The species of polymer B is not particularly limited and a suitable species is selected in accordance with the species of polymer A as the base polymer. As the polymer B, one, two or more species can be used among, for instance, rubber-based polymers (typically diene-based polymers), olefinic polymers, acrylic polymers, polyester-based polymers, urethane-based polymers, polyether-based polymers, silicone-based polymers, polyamide-based polymers, and fluoropolymers. For use in a magnetic disc device, it is desirable that the polymer B is essentially free of a silicone-based polymer that may form siloxane gas.

The polymer B according to a preferable embodiment is selected among olefinic polymers and diene-based polymers. Presumably these polymers are likely to block passage of water molecules because they generally have low polarity with short side chains. In addition, it tends to be readily dissolved or dispersed in the PSA layer when the polymer A is a rubber-based polymer. In particular, olefinic polymers are more preferable as they are thermally stable and highly weather resistant. The monomers for forming the polymer B can be one, two or more species of monomers selected among ethylene propylene, butene, isobutylene, isoprene and butadiene. Here, the butene encompasses 1-butene as well as cis- and trans-2-butenes. The polymer B is preferably a polymer formed from a monomer mixture that includes one, two or more species of the monomers exemplified above at a ratio of at least 50% by weight. Specific examples include ethylene-butene copolymer, ethylene-propylene-butene copolymer, propylene-butene copolymer, ethylene-butene-unconjugated diene copolymer, and ethylene-propylene-butene-unconjugated diene copolymer. These polymers include so-called ethylene propylene rubber.

In a more preferable embodiment, the polymer B is a polymer formed from a monomer mixture that includes at least one species of monomer at a ratio of at least 50% by weight, selected from the group consisting of butene, isobutylene and isoprene. The polymer obtained from these monomers is hydrophobic and non-polar; and therefore, it is likely to bring about excellent moisture resistance, combined with the effect to prevent moisture permeation based on the molecular weight in the prescribed range. The monomer mixture to form the polymer B includes one, two or more species of the monomers at a ratio of more preferably at least 75% by weight, yet more preferably at least 85% by weight, or particularly preferably at least 90% (e.g. at least 95%) by weight. The ratio of these monomers in the entire monomers can also be 99% by weight or more. The polymer B may be obtained by copolymerizing one, two or more species of other monomers (e.g. butadiene, styrene, ethylene, and propylene) copolymerizable with the monomers exemplified above.

In a particularly preferable embodiment, the polymer B is a polybutene, that is, a polymer formed from a monomer mixture that includes a monomer selected among butene (1-butene, cis- or trans-2-butene) and isobutene (isobutylene) at a ratio of at least 50% by weight. The polymerization ratio of butene and isobutene in the polybutene as the polymer B is preferably about 75% by weight or higher, more preferably about 85% by weight or higher, or yet more preferably about 90% by weight or higher (e.g. about 95% by weight or higher). The butene and isobutene content in the entire monomers can also be 99% by weight or higher.

The polybutene is a polymer formed from a monomer mixture that includes isobutene as the primary component and may arbitrarily include a certain amount of normal butene (1-butene, cis- or trans-2-butene). Polybutene is thermally stable and highly weather resistant because, unlike diene-based rubber, its molecular chain is free of a double bond. It is also highly moisture resistant. The primary component is isobutene with a short side chain (—$CH_3$) and the motility of the main chain is low because of the molecular structure; and therefore, it is likely to block passage of water molecules. The copolymerization ratio of isobutene in the polybutene is preferably about 50% by weight or higher, more preferably about 70% by weight or higher, or possibly about 80% by weight or higher (e.g. about 90% by weight or higher).

The polymer B can be obtained by a method suitably selected from various known polymerization methods. Alternatively a commercial product corresponding to the polymer B can be obtained and used. For instance, a polybutene can be obtained by polymerizing a monomer mixture that includes butene and isobutene with the use of a Lewis acid catalyst (e.g. aluminum chloride, boron trifluoride), etc. Alternatively a species corresponding to the polymer B can be selected and used among commercial products such as the NISSEKI POLYBUTENE series available from JXTG Nippon Oil & Energy Corporation and the NICHIYU POLYBUTENE series available from NOF Corporation.

In the PSA layer disclosed herein, the ratio ($C_B/C_A$) of polymer B content ($C_B$) to polymer A content ($C_A$) is suitably about 0.1 or higher. From the standpoint of the moisture resistance, the $C_B/C_A$ ratio is preferably about 0.3 or higher, more preferably about 0.5 or higher, or yet more preferably about 0.7 or higher (e.g. about 0.9 or higher). The $C_B/C_A$ ratio is suitably about 2 or lower. From the standpoint of inhibiting a decrease in holding power, the $C_B/C_A$ ratio is preferably about 1.5 or lower, or more preferably about 1.2 or lower (e.g. about 1.1 or lower).

The polymer B content in the layer disclosed herein is suitably selected in view of the effect of polymer B. From the standpoint of the moisture resistance, the polymer B content in the PSA layer is suitably about 10% by weight or higher, preferably about 20% by weight or higher, more preferably about 30% by weight or higher, or yet more preferably about 40% by weight or higher. From the standpoint of inhibiting a decrease in holding power, the polymer B content in the PSA layer is suitably about 70% by weight or lower, or preferably about 60% by weight or lower (e.g. about 55% by weight or lower).

In a preferable embodiment, the PSA layer may have a composition such at the combined amount of polymer A as a base polymer and polymer B accounts for more than 50% by weight of the PSA layer's total weight (i.e. the weight of the PSA layer formed with the PSA). For instance, the combined amount of polymer A and polymer B is preferably about 75% by weight or more of the PSA layer's total weight, more preferably about 85% by weight or more, or yet more preferably about 90% by weight or more (e.g. 95% by weight or more).

(Other Additives)

Besides the components described above, the PSA composition may comprise, as necessary, various additives generally known in the field of PSA, such as tackifier (tackifier resin), leveling agent, crosslinking accelerator, plasticizer, filler, colorant such as pigment and dye, softener, anti-static agent, anti-aging agent, UV absorber, antioxidant and photo-stabilizer. It may arbitrarily include a third polymer that is not either a polymer A or B. With respect to these various additives, heretofore known species can be used by typical methods. From the standpoint of the accuracy of reading and writing by the magnetic disc device, the art disclosed herein can be preferably implemented in an embodiment where the PSA layer has a composition essentially free of, for instance, UV absorber, antioxidant, and photo-stabilizer such as hindered amine-based photo-stabilizer and hindered phenolic antioxidant.

Some applications may allow the PSA sheet disclosed herein to outgas only up to a certain limit. Thus, it is desirable to avoid the use of a low molecular weight component that may lead to outgassing. From such a standpoint, the additive content (e.g. tackifier resin, anti-aging agent, UV absorber, antioxidant, photo-stabilizer) in the PSA layer is preferably limited to below about 30% (e.g. below 10% typically below 3%) by weight. The art disclosed herein can be preferably implemented in an embodiment where the PSA layer is essentially free of other additives (e.g. tackifier resin, anti-aging agent, UV absorber, antioxidant, and photo-stabilizer).

The PSA layer can be formed based on a method for forming a PSA layer in a known PSA sheet. For example, it is preferable to use a method (direct method) where a PSA composition having PSA-layer forming materials dissolved or dispersed in a suitable solvent is directly provided (typically applied) to a substrate (a moisture-impermeable layer) and allowed to dry to form a PSA layer. In another method (transfer method) that can be employed, the PSA composition is provided to a highly-releasable surface (e.g. a surface of a release liner, a substrate's back face that has been treated with release agent, etc.) and allowed to dry to form a PSA layer on the surface, and the PSA layer is transferred to a support substrate (a moisture-impermeable layer). As the release face, a surface of a release liner, a substrate's back face that has been treated with release agent, and the like can be used. The PSA layer disclosed herein is typically formed in a continuous manner.

The form of the PSA composition is not particularly limited. For instance, it can be in various forms, such as a PSA composition (a solvent-based PSA composition) that comprises PSA-layer-forming materials as described above in an organic solvent, a PSA composition (water-dispersed PSA composition, typically an aqueous emulsion-based PSA composition) in which the PSA is dispersed in an aqueous solvent, a PSA composition that is curable by an active energy ray (e.g. UV ray), and a hot-melt PSA composition. From the standpoint of the ease of application and the adhesive properties, a solvent-based PSA composition can be preferably used. As the solvent, it is possible to use one species of solvent or a mixture of two or more species, selected among aromatic compounds (typically aromatic hydrocarbons) such as toluene and xylene; acetic acid esters such as ethyl acetate and butyl acetate; and aliphatic or alicyclic hydrocarbons such as hexane, cyclohexane, heptane and methyl cyclohexane. While no particular limitations are imposed, it is usually suitable to adjust the solvent-based PSA composition to include 5% to 30% non-volatiles (NV) by weight. Too low an NV tends to result in higher production costs while too high an NV may degrade the handling properties such as the ease of application.

The PSA composition can be applied, for instance, with a known or commonly used coater such as gravure roll coater, reverse roll coater, kiss roll coater, dip roll coater, bar coater knife coater, and spray coater.

In the art disclosed herein, the thickness of the PSA layer forming the adhesive face is not particularly limited. The PSA layer has a thickness of suitably 3 µm or greater, preferably 10 µm or greater, or more preferably 20 µm or greater. With increasing thickness of the PSA layer, the adhesive strength to adherend tends to increase. Having at least a certain thickness, the PSA layer absorbs the adherend's surface roughness to form tight adhesion. When the PSA layer has a thickness of 10 µm or greater, for instance, it can provide good, tight adhesion to an adherend having a surface whose arithmetic mean surface roughness Ra is about 1 µm to 5 µm (e.g. 3 µm). The thickness of the PSA layer forming the adhesive face can be, for instance, 150 µm or less; it is suitably 100 µm or less, or preferably 50 µm or less. With decreasing thickness of the PSA layer, it tends to show a greater ability to inhibit water vapor from laterally permeating the PSA layer, leading to reduction of outgassing from the PSA layer. A smaller thickness of the PSA layer is also advantageous from the standpoint of reducing the thickness and weight of the PSA sheet.

(Properties of PSA Layer)

The storage modulus at 25° C., G'(25° C.), of the PSA layer disclosed herein is not particularly limited and it can be set in a suitable range according to required properties, etc. In a preferable embodiment, the G'(25° C.) is less than 0.5 MPa. The PSA layer with G'(25° C.) at or below a prescribed value wets the adherend surface well to form tight adhesion. The G'(25° C.) is more preferably 0.4 MPa or less, yet more preferably 0.3 MPa or less, or particularly preferably 0.25 MPa or less. The G'(25° C.) can also be, for instance, 0.2 MPa or less). The G'(25° C.) value is not particularly limited and is suitably greater than about 0.01 MPa. From the standpoint of the adhesive properties and of preventing leftover adhesive residue, etc., it is preferably 0.05 MPa or greater, or more preferably 0.07 MPa or greater (e.g. 0.1 MPa or greater).

In the art disclosed herein, the storage moduli G'(25° C.) of a PSA layer can be determined by dynamic elastic modulus measurement. In particular, several layers of the PSA subject to measurement are layered to fabricate an approximately 2 mm thick PSA layer. A specimen obtained by punching out a disc of 7.9 mm diameter from the PSA layer is fixed between parallel plates. With a rheometer (e.g. ARES available from TA Instruments or a comparable system), dynamic elastic modulus measurement is carried out to determine the storage moduli G'(25° C.). The PSA (layer) subject to measurement can be formed by applying a layer the corresponding PSA composition on a release face of a release liner or the like and allowing it to dry or cure. The thickness (coating thickness) of the PSA layer subjected to the measurement is not particularly limited as long as it is 2 mm or less. It can be, for instance, about 50 µm.

Measurement mode: shear mode
Temperature range: −50° C. to 150° C.
Heating rate: 5° C./min
Measurement frequency: 1 Hz The same measurement method is also used in the working examples described later.

<Moisture-Impermeable Layer>

As used herein, the moisture-impermeable layer refers to a layer (film) having a moisture permeability (a water vapor transmission rate in the thickness direction) lower than $5\times10^{-1}$ g/m$^2$·24 h when determined at 40° C. at 90% RH based on the MOCON method (JIS K7129:2008). The moisture-impermeable layer in the art disclosed herein is formed by suitably selecting materials and a way of layering so as to satisfy the moisture impermeability. With the use of the moisture-impermeable layer, it is possible to obtain a PSA sheet resistant to moisture in the thickness direction. The moisture permeability is preferably lower than $5\times10^{-2}$ g/m$^2$·24 h, or more preferably lower than $5\times10^{-3}$ g/m$^2$·24 h, for instance, lower than $5\times10^{-5}$ g/m$^2$·24 h. As the moisture permeability tester, PERMATRAN W3/33 available from MOCON, Inc. or a comparable product can be used. It is noted that in the PSA sheet disclosed herein, the moisture-impermeable layer can also serve as a substrate (support substrate) to support the PSA layer.

In a preferable embodiment, the moisture-impermeable layer disclosed herein includes an inorganic layer. The material or structure of the inorganic layer is not particularly limited and can be selected in accordance of the purpose and usage. From the standpoint of the moisture resistance and airtight properties, it is advantageous that the inorganic layer is essentially non-porous. In typical a preferable inorganic layer is essentially formed of an inorganic material. For instance, an inorganic layer formed of at least 95% (by weight) inorganic material is preferable (more preferably at least 98% by weight, or yet more preferably at least 99% by weight). The number of inorganic layers in the moisture-impermeable layer is not particularly limited; it can be one, two or more (e.g. about two to five). From the standpoint of the ease of manufacturing and availability the number of inorganic layers in the moisture-impermeable layer is preferably about 1 to 3, or more preferably one or two. When the moisture-impermeable layer includes several inorganic layers, the materials and structures (thicknesses, etc.) of these inorganic layers can be the same with or different from one another.

As the inorganic material forming the inorganic layer, it is possible to use, for instance, metal materials including elemental metals such as aluminum, copper, silver, iron, tin, nickel, cobalt, and chromium as well as alloys of these; and inorganic compounds such as oxides, nitrides and fluorides of metals and metalloids including silicon, aluminum, titanium, zirconium, tin and magnesium. Specific examples of the inorganic compounds include silicon oxides (SiO$_x$, typically SiO$_2$), aluminum oxide (Al$_2$O$_3$), silicon nitride (Si$_3$N$_4$), silicon oxide nitride (SiO$_x$N$_y$), titanium oxide (TiO$_2$), and indium tin oxide (ITO).

The metal materials can be used as the inorganic layers as metal foils (e.g. aluminum foil) formed by a known method such as rolling by a rolling mill, etc. Alternatively, for instance, a metal material formed in a layer by a known film-forming method such as vacuum vapor deposition, spattering and plating.

The inorganic compound can be typically used as the inorganic layer in a form of thin film formed by a known method. As the method for forming thin film of the inorganic compound, various vapor deposition methods can be used. For instance, physical vapor deposition methods (PVD) such as vacuum vapor deposition, spattering and ion plating, chemical vapor deposition methods (CVD) and like method can be used. The moisture-impermeable layer may further have a resin layer on top of the vapor deposition layer. For instance, the resin layer may be a topcoat layer provided for purposes such as protecting the vapor deposition layer.

From the standpoint of the moisture resistance, ease of manufacturing, availability etc., it is preferable to use an inorganic layer formed of for instance, aluminum or an aluminum alloy. From the standpoint of the moisture resistance, ease of manufacturing, availability; etc., as the inorganic layer thrilled of an inorganic compound, for instance, a silicon oxide layer or an aluminum oxide layer can be preferably used. Examples of an inorganic layer preferable for being able to form a highly transparent, inorganic layer include a silicon oxide layer, an aluminum oxide layer and an ITO layer.

The maximum thickness of the inorganic layer is not particularly limited. From the standpoint of obtaining conformability to shapes of adherends, the inorganic layer advantageously has a thickness of 50 μm or less. From the standpoint of reducing the thickness and weight of the PSA sheet, the thickness of the inorganic layer is suitably 15 μm or less, preferably 13 μm or less, more preferably 11 μm or less, or yet more preferably 9 μm or less. When the moisture-impermeable layer includes several inorganic layers, the combined thickness of these inorganic layers is in these ranges. The minimum thickness of the inorganic layer is not particularly limited and can be suitably selected so as to obtain a PSA sheet that shows moisture resistance suited for the purpose and usage. The thickness of the inorganic layer is suitably 1 nm or greater. From the standpoint of the moisture resistance, air tight properties, etc., it is preferably 2 nm or greater, or more preferably 5 nm or greater. When the moisture-impermeable layer includes several inorganic layers, it is preferable that at least one of them has a thickness in these ranges. Each of the several inorganic layers may have a thickness in these ranges as well.

The preferable thickness range of the inorganic layer may also vary depending on the material of the inorganic layer, the formation method, etc. For instance, when metal foil (e.g. aluminum foil) forms the inorganic layer (or the metal layer), in view of the moisture resistance, ease of manufacturing, crease resistance, etc., its thickness is suitably 1 μm or greater, preferably 2 μm or greater, or more preferably 5 μm or greater. In view of the flexibility which leads to adherend conformability the metal layer's thickness is suitably 50 μm or less, preferably 20 μm or less, more preferably 15 μm or less, yet more preferably 12 μm or less, or particularly preferably 10 μm or less. With respect to the inorganic layer formed by vapor deposition of an inorganic compound, in view of the balance between flexibility and ease of manufacturing the moisture-impermeable layer, its thickness is suitably in a range between 1 nm and 1000 nm, preferably in a range between 2 nm and 300 nm, or more preferably in a range between 5 nm and less than 100 nm.

The moisture-impermeable layer disclosed herein may include a resin layer in addition to the inorganic layer. The resin layer may serve as a protection layer to prevent the inorganic layer from getting damaged by bending deformation and friction. Thus, the moisture-impermeable layer including the resin layer in addition to the inorganic layer is preferable from the standpoint of the endurance and reliability of moisture-resistant properties and also from the standpoint of the ease of handling the moisture-impermeable layer or the PSA sheet. By placing the resin layer on the PSA layer side surface of the moisture impermeable layer, the anchoring of the PSA layer can be enhanced. When the inorganic layer is formed by vapor deposition, spattering or like method, the resin layer can be used as the base for forming the inorganic layer.

The structure of the resin layer not particularly limited. For instance, the resin layer may include a void space as in fiber assemblies such as woven fabrics and non-woven fabrics or as in foam bodies such as polyethylene foam; or it can be a resin layer (resin film) essentially free of a void space. From the standpoint of reducing the thickness of the PSA sheet, it is preferable use a resin layer essentially free of a void space.

As the resin material forming the resin layer, it is possible to use, for instance, polyester resins such as polyethylene terephthalate (PET), polybutylene terephthalate (PBT) and polyethylene naphthalate (PEN); polyolefin resins such as polyethylene (PE) and polypropylene (PP); polyimide (PI); polyetheretherketone (PEEK); chlorine-containing polymers such as polyvinyl chloride (PVC) and polyvinylidene chloride; polyamide-based resins such as nylon and aramid polyurethane resin polystyrene-based resin; acrylic resins; fluororesins; cellulose-based resins; and polycarbonate-based resins. Of these, solely one species or a combination of two or more species can be used. When two or more species of resin are used together, these resins can be used blended or separately Both thermoplastic resins and thermosetting resins can be used. From the standpoint of the ease of forming film, etc., a thermoplastic resin is preferably used.

In the moisture-impermeable layer including a resin layer, at an edge face of the PSA sheet, water vapor may enter the resin layer from its side (lateral surface). From the standpoint of inhibiting such entrance of water vapor, as the resin material forming the resin layer, a highly moisture-resistant material can be preferably used. For instance, a preferable resin layer is formed, using a resin material whose primary component is a polyester resin such as PET or a polyolefinic resin such as PE and PP. In a preferable embodiment, PET film can be preferably used as the resin layer. In another preferable embodiment, as the resin layer, it is preferable to use BOPP (biaxially oriented polypropylene) film obtainable by forming film of a resin material that comprises PP as the primary component and biaxially stretching the film. In the PSA sheet having no inorganic layer further on the adherend side relative to the resin layer, it is particularly significant to inhibit entrance of water vapor from the lateral surface of the resin layer. A typical example of the PSA sheet having such a constitution is a PSA sheet in which the PSA layer side surface of the moisture-impermeable layer is formed with a resin layer.

The resin layer may include, as necessary; various additives such as fillers (inorganic fillers, organic fillers, etc.), anti-aging agent, antioxidant, UV absorber, anti-static agent, slip agent and plasticizer. The ratio of the various additives included is below about 30% by weight (e.g. below 20% by weight, typically below 10% by weight).

The number of resin layers in the moisture-impermeable layer is not particularly limited and it can be one, two or more (e.g. about, two to five). From the standpoint of the ease of manufacturing and availability the number of resin layers in the moisture-impermeable layer is preferably one to three, or more preferably one or two. When the moisture-impermeable layer includes several resin layers, the materials and structures (thicknesses, inclusion of a void space, etc.) of these resin layers can be the same with or different from one another.

The method for forming the resin layer is not particularly limited. A heretofore known general resin film molding method can be suitably employed to form the resin layer, for instance, extrusion molding, inflation molding, T-die casting, calender roll molding and wet casting. The resin layer may a non stretched kind or may be subjected to a stretching process such as uni-axial stretching and biaxial stretching.

The minimum thickness of the resin layer is not particularly limited. From the standpoint of the crease resistance, ease of forming film, etc., the thickness of the resin layer is suitably 1 μm or greater, preferably 3 μm or greater, more preferably 5 μm or greater, or yet more preferably 7 μm or greater. When the moisture-impermeable layer includes several resin layers, it is preferable that at least one of them has a thickness in these ranges. Each of the several resin layers may have a thickness in these ranges as well.

The maximum thickness of the resin layer is not particularly limited. For instance, it can be 100 μm or less. From the standpoint of reducing the thickness and weight of the PSA sheet, the thickness of the resin layer is suitably 70 μm or less, preferably 55 μm or less, or more preferably 35 μm or less. When the moisture-impermeable layer includes several resin layers; the combined thickness of these resin layers is preferably in these ranges. In general, the moisture permeability of the resin layer is higher than that of the inorganic layer. Thus, it is also preferable to make the combined thickness of resin layers smaller from the standpoint of preventing water vapor from entering the resin layer from its lateral surface.

The inorganic layer and the resin layer are preferably bonded. The bonding method is not, particularly limited. A method known in the pertinent field can be suitably employed. For instance, it is possible to employ a method (extrusion lamination) where a resin material for forming the resin layer is melted and extruded along with a pre-molded inorganic layer (typically metal foil), a method where a solution or dispersion of the resin material for forming the resin layer is applied to a pre-molded inorganic layer and allowed to dry, and like method. Alternatively, it is also possible to employ a method where an inorganic layer is vapor-deposited on a pre-molded resin layer, a method where an inorganic layer is bonded to a separately-molded resin layer, and like method. For instance, the bonding can be achieved by hot pressing. The resin lacer and the inorganic layer can be bonded via an adhesive layer or a PSA layer.

The adhesive layer to bond the resin layer and the inorganic layer can be an undercoat layer formed by applying an undercoat such as primer to the resin layer. As the undercoat, those known in the pertinent field can be used, such as urethane-based undercoat, ester-based undercoat, acrylic undercoat, and isocyanate-based undercoat. From the standpoint of reducing the thickness and weight of the PSA sheet, the thickness of the undercoat layer is suitably 7 μm or less, preferably 5 μm or less, or more preferably 3 μm or less. The minimum thickness of the undercoat layer is not particularly limited. For instance, it can be 0.01 μm or greater (typically 0.1 μm or greater).

Before the bonding process, the resin layer may be subjected to common surface treatment, chemical or physical treatment, the instance, mattifying treatment, corona discharge treatment, crosslinking treatment, chromic acid treatment, ozone exposure, flame exposure, high-voltage electric shock exposure, and ionized radiation treatment.

The PSA layer(s) placed between layers forming the moisture-impermeable layer to bond them together are not exposed to the surface of the PSA sheet; and therefore, they do not correspond to the PSA layer forming the adhesive the of the PSA sheet. In the PSA sheet disclosed herein, the material and physical properties of such a PSA layer for internal use in the moisture-impermeable layer are not particularly limited. The PSA layer can be formed of a PSA similar to the PSA layer forming the adhesive face or can be formed of a different PSA. It is not particularly limited in thickness, either. For instance, it may have a comparable thickness to the undercoat layer.

Favorable examples of the moisture-impermeable layer used in the PSA sheet disclosed herein include a moisture-impermeable layer formed of a laminate body that comprises an inorganic layer as well as first and second resin layers laminated on top and bottom of the inorganic layer. The first and second resin layers forming the moisture-impermeable layer are laminated on top and bottom of the inorganic layer. As long as such a layer order can be obtained, the first and second resin layers may be in direct contact with the inorganic layer or they may be placed via undercoat layers as described above to obtain tight adhesion between themselves and the inorganic layer. In the PSA sheet disclosed herein, the first resin layer refers to the resin layer placed on the backside (the front face of the moisture-impermeable layer) of the PSA sheet relative to the inorganic layer and the second resin layer refers to the resin layer placed on the PSA layer side.

The inorganic layer can be a metal layer formed of an aforementioned metal material. For instance, an aluminum layer is preferable. The first and second resin layers are preferably formed from the same material. For instance, thermoplastic resins exemplified above can be used. Of these materials, solely one species or a combination of two or more species can be used. Each of the first and second resin layers may have a layered structure with two or more layers, but is preferably a monolayer. In particular preferable materials forming the first and second resin layers include PET, PP and polystyrene. PET and PP are more preferable.

The first and second resin layers have thicknesses $T_{R1}$ and $T_{R2}$, respectively, and their ratio ($T_{R1}/T_{R2}$) is not particularly limited, but is suitably 0.5 or greater, preferably 1 or greater, more preferably 1.5 or greater, or yet more preferably 2.0 or greater. The $T_{R1}/T_{R2}$ ratio is suitably about 10 or less, preferably 7.0 or less, more preferably 5.0 or less, or yet more preferably 4.0 or less. When the $T_{R1}/T_{R2}$ ratio is in these ranges, adherend conformability and crease resistance can be preferably combined. The thickness $T_{R1}$ of the first resin layer is suitably about 10 μm or greater, preferably 15 μm or greater, more preferably 18 μm or greater, or yet more preferably 20 μm or greater (e.g. 22 μm or greater). $T_{R1}$ is suitably about 100 μm or less, preferably 70 μm or less, more preferably 60 μm or less, yet more preferably 50 μm or less, or particularly preferably 35 μm or less. The thickness $T_{R2}$ of the second resin layer is suitably about 1 μm or greater, preferably 3 μm or greater, more preferably 5 μm or greater, or yet more preferably 7 μm or greater. $T_{R2}$ is suitably about 25 μm or less, preferably 20 μm or less, more preferably 15 μm or less, or yet more preferably 12 μm or less (e.g. 10 μm or less).

The inorganic layer has a thickness and the first and second resin layers have a combined thickness $T_R$ ($=T_{R1}+T_{R2}$); and their ratio ($T_R/T_I$) is not particularly limited. From the standpoint of preventing creases, protecting the inorganic layer etc., the ratio is suitably 1 or greater, preferably 2 or greater, more preferably 3 or greater, or yet more preferably 4 or greater. When it is bent and applied to accommodate the adherend shape, in view of the adherend conformability; the $T_R/T_I$ ratio is suitably 10 or less, preferably 8 or less, or more preferably 6 or less. The total ($T_R$) of the first and second resin layers' thicknesses $T_{R1}$ and $T_{R2}$ is suitably about 15 μm or greater, preferably 20 μm or greater, more preferably 25 μm or greater, or yet more preferably 30 μm or greater. $T_R$ is suitably about 100 μm or less, preferably 80 µm or less, more preferably 70 µm or less, or yet more preferably 60 µm or less (e.g. 50 µm or less). The moisture-impermeable layer in this embodiment can effectively protect the inorganic layer (e.g. an aluminum layer) as thin film from bending, creasing, breaking, etc. By this, even when the PSA sheet is exposed to various stressors in the manufacturing process, etc., or even when it is exposed to a harsh environment for a long period while in use, it can securely maintain the properties as the moisture-resistant film.

As the method for forming a laminate body having the inorganic layer, first resin layer and second resin layer, it is possible to employ various methods as described earlier, such as a method where the respective layers are formed as films by a known method and they are laminated dry by forming undercoat layers described above, a method where the inorganic layer is formed on the first resin layer in a tightly bonded manner and the second resin layer is laminated dry or extrusion-laminated on top of it, and like method.

The minimum thickness of the moisture-impermeable layer is not particularly limited. From the standpoint of the ease of manufacturing and handling the PSA sheet, the thickness of the moisture-impermeable layer is about 3 µm or greater, or suitably about 5 µm or greater (e.g. 10 µm or greater). To obtain moisture resistance and rigidity unsusceptible to creasing, it is desirable that the moisture-impermeable layer is thick. From such a standpoint, the thickness of the moisture-impermeable layer is preferably 15 µm or greater, more preferably 20 µm or greater, yet more preferably 30 µm or greater, or particularly preferably 40 µm or greater. The maximum thickness of the moisture-impermeable layer is not particularly limited, either. It is about 1 mm or less, or suitably about 300 µm or less (e.g. 150 µm or less). From the standpoint of the adherend conformability of the PSA sheet and of reducing its thickness and weight, the thickness of the moisture-impermeable layer is preferably 100 µm or less, more preferably 80 µm or less, yet more preferably 70 µm or less, or particularly preferably 65 µm or less (e.g. 55 µm or less). The moisture-impermeable layer with such a limited thickness is less likely to lead to limitation of a space between the adherend and the PSA sheet; and therefore, it can prevent water vapor permeation through the space.

The PSA layer-side surface of the moisture-impermeable layer may be subjected to common surface treatment, chemical or physical treatment, for instance, mattifying treatment, corona discharge treatment, crosslinking treatment, chromic acid treatment, ozone exposure, flame exposure, high-voltage electric shock exposure, and ionized radiation treatment. On the PSA layer-side surface of the moisture-impermeable layer, an undercoat layer may be placed, which is formed by applying an undercoat such as primer to the resin layer. As the undercoat, those known in the pertinent field can be used, such as urethane-based, ester-based, acrylic, and isocyanate-based kinds. From the standpoint of reducing the thickness and weight of the PSA sheet, the thickness of the undercoat layer is suitably 7 µm or less, preferably 5 µm or less, or more preferably 3 µm or less.

<Total Thickness of PSA Sheet>

The total thickness of the PSA sheet disclosed herein is not particularly limited. It is suitably about 6 µm or greater. From the standpoint of the moisture resistance and crease resistance, etc., it is preferably 25 µm or greater, more preferably 40 µm or greater, or yet more preferably 60 µm or greater. The total thickness is suitably about 1.2 mm or less. From the standpoint of the adherend conformability and of reducing the thickness and weight, it is preferably 200 µm or less, more preferably 150 µm or less, or yet more preferably 120 µm or less (e.g. less than 100 µm). The total thickness of a PSA sheet here refers to the combined thickness of the moisture-impermeable layer and the PSA layer, not including the thickness of the release liner described later.

<Release Liner>

In the art disclosed herein, a release liner be used during formation of the PSA layer; fabrication of the PSA sheet; storage, distribution and shape machining of the PSA sheet, prior to use, etc. The release liner is not particularly limited. For example, a release liner having a release layer on the surface of a liner substrate such as resin film and paper; a release liner formed from a low adhesive material such as a fluoropolymer (polytetrafluoroethylene, etc.) or a polyolefinic resin (PE, PP, etc.); or the like can be used. The release layer can be filmed, for instance, by subjecting the liner substrate to a surface treatment with a release agent such as a silicone-based, long-chain alkyl-based, fluorine-based, or molybdenum disulfide-based release agent. When the PSA sheet is used as a sealing material for a magnetic disc device, it is preferable to use a non-silicone-based release liner free of a silicone-based release agent which may produce siloxane gas.

<Properties of PSA Sheet>

The PSA sheet disclosed herein preferably has a through-bonding-plane moisture permeability lower than 90 $\mu g/cm^2 \cdot 24$ h when determined at a permeation distance of 2.5 mm based on the MOCON method (equal-pressure method). This limits the moisture permeation in in-plane directions of the bonding area (in directions perpendicular to the thickness direction of the PSA sheet) and excellent moisture resistance can be preferably obtained. The through-bonding-plane moisture permeability is more preferably less than 30 $\mu g/cm^2 \cdot 24$ h, yet more preferably less than 25 $\mu g/cm^2 \cdot 24$ h, or particularly preferably less than 20 $\mu g/cm^2 \cdot 24$ h.

In particular, the through-bonding-plane moisture permeability is determined by the method described below.

(1) A metal plate having a 50 mm square opening at the center is obtained. FIG. 2 outlines a moisture permeability tester 50 used for determining the moisture permeability. In FIG. 2, reference number 56 shows the metal plate and reference number 58 shows the opening made in metal plate 56. FIG. 3 shows a top view of metal plate 56 having opening 58.

(2) The PSA sheet subject to measurement is cut to a 55 mm square and applied to cover the opening in the metal plate to prepare a measurement sample. The PSA sheet is applied to the metal plate over a bonded width of 2.5 mm at each side of the opening. The PSA sheet is applied by rolling a 2 kg roller back and forth once. The bonded width of the PSA sheet at each side of the opening is the width of the band of bonding area between the PSA sheet and the metal plate, indicating the permeation distance (mm) in the in-plane direction of bonding area of the PSA sheet. The circumference of the opening in the metal plate is referred to as the bonded length (mm). The bonded length (mm) is the total length of the band of bonding area exposed to water vapor. In particular, the measurement sample has a structure shown by reference number 60, formed of metal plate 56 and PSA sheet 1 applied to metal plate 56.

(3) Based on Method B of JIS K 7129:2008, the measurement sample is placed between a dry chamber and a wet chamber in the moisture permeability tester. In particular, as shown in FIG. 2, a measurement sample 60 is positioned between a dry chamber 54 and a wet chamber 52. In FIG. 2, WV represents water vapor.

(4) Based on the MOCON method (equal-pressure method), conditioning is carried out for 3 hours. Subsequently, as shown in FIG. 2, at 40° C. and 90% RH, the amount (μg) of moisture that has permeated in in-plane directions of bonding area of PSA sheet per 6 hours is determined.

(5) To obtain the through-bonding-plane moisture permeability (μg/cm²·24 h), the amount of permeated moisture per 24 hours converted from the measurement value and the PSA layer's surface area (permeation distance×bonded length) are substituted into the equation:

Moisture permeability (μg/cm²·24 h)=amount of permeated moisture (μg)/(permeation distance (cm)×bonded length (cm)×24 h)

As used herein, the "through-bonding-plane moisture permeability (μg/cm²·24 h) determined at a permeation distance of 2.5 mm based on the MOCON method (equal-pressure method)" can be a value obtained by a measurement of 24 hours, but it is not limited to this; as described above, a 24-hour value converted from a measurement taken for a certain time period (e.g. 6 hours) can be used. A 24-hour value converted from a measurement taken for a time period longer than 6 hours can be used as well.

The kind of metal plate is not particularly limited. For instance, an aluminum plate can be used. The size of the metal plate is not particularly limited, either. In accordance with the tester size, etc., for instance, a 100 mm square plate can be used. It is suitable to use a metal plate having a smooth surface, for instance, one having a mean arithmetic roughness Ra of about 3 μm or less. As the tester, product name PERMATRAN-3/34G available from MOCON, Inc. or a comparable product can be used. In a tester of this type, $N_2$ gas at 90% RH can be supplied to the wet chamber and $N_2$ gas at 0% RH can be supplied to the dry chamber. This maintains the two chambers divided by the measurement sample at an equal pressure. In the tester, the water vapor concentration is measured by an infrared sensor (indicated as "IR" in FIG. 2), but the means of detection is not limited to this. The position of the measurement sample in the tester is not particularly limited. The adhesive face of the PSA sheet can be placed either on the wet chamber side or on the dry chamber side. The same measurement method is employed in the working examples described later.

This measurement method has been created by the present inventors. This method can accurately measure the amount of moisture that permeates in the in-plane direction, which has been heretofore impossible. More specifically, between different samples showing similar values in the moisture permeability test by the conventional cup method, a significant difference in through-bonding-plane moisture permeability can be detected. The use of this method allows for a higher-level evaluation of moisture resistance. For instance, it can quantify a minute water vapor transmission which may affect HAMR.

The PSA sheet disclosed herein preferably has an amount of thermally released gas of 10 μg/cm² or less (in particular, 0 to 10 μg/cm²) when determined at 130° C. for 30 minutes by GC-MS. The PSA sheet with such highly-limited thermal gas release can be preferably used in an application (typically a magnetic disc device) for which the presence of volatile gas is undesirable. When the PSA sheet satisfying this property is used as a sealing material for a magnetic disc device, it can highly inhibit internal contamination with siloxane and other gas that affect the device. The amount of thermally released gas is preferably 7 μg/cm² or less, more preferably 5 μg/cm² or less, yet more preferably 3 μg/cm² or less, or particularly preferably 1 μg/cm² or less.

The amount of thermally released gas is determined based on the dynamic headspace method. In particular, a PSA sheet subject to measurement is cut out to a 7 cm² size to obtain a measurement sample. The measurement sample is sealed in a 50 mL vial and heated at 130° C. for 30 minutes, using a headspace autosampler. As the headspace autosampler, a commercial product can be used without particular limitations. For instance, product name EQ-12031HSA available from JEOL Ltd., or a comparable product can be used. The total amount of gas released from the measurement sample is determined by gas chromatography/mass spectrometry (GC-MS). A commercial CC-MS can be used. The amount of thermally released gas is the amount of gas released per unit surface area of PSA sheet (in μg/cm²). The same measurement method is employed in the working examples described later.

The PSA sheet disclosed herein preferably has a 180° peel strength (adhesive strength) to stainless steel of about 3 N/20 mm or greater when determined based on JIS Z 0237:2009. The PSA sheet having such adhesive strength can adhere well to an adherend and provide good sealing. The adhesive strength is more preferably 5 N/20 mm or greater, or yet more preferably about 7 N/20 mm or greater. The maximum adhesive strength is not particularly limited. From the standpoint of preventing leftover adhesive residue, it is suitably about 20 N/20 mm or less (e.g. about 15 N/20 mm or less).

The adhesive strength of a PSA sheet is determined by the following method: A PSA sheet subject to measurement is cut to a 20 mm wide, 100 mm long size to prepare a test piece. In an environment, at 23° C. and 50% RH, the adhesive face of the test piece is press-bonded to a stainless steel plate (SUS304BA plate) to obtain a measurement sample. The press-bonding is carried out by rolling a 2 kg roller back and forth once. The measurement sample is left standing in an environment at 23° C. and 50% RH for 30 minutes. Subsequently, using a tensile tester, based on JIS Z 0237:2009, the peel strength (N/20 mm) is determined at a tensile speed of 300 mm/min at a peel angle of 180°. As the tensile tester, Precision Universal Tensile Tester Autograph AG-IS 50N available from Shimadzu Corporation or a comparable product can be used. The same measurement method is employed in the working examples described later.

The PSA sheet disclosed herein preferably shows a displacement less than about 5 mm in a shear holding power test carried out with a 1 kg load at 60° C. for one hour. The PSA sheet satisfying this property shows good holding power even when used at a relatively high temperature. The displacement in the shear holding power test is more preferably less than about 3 mm, or yet more preferably less than about 2 mm.

The shear holding power of a PSA sheet is determined by the following method: In particular, the PSA sheet subject to measurement is cut 10 mm wide, 20 mm long to prepare a test piece. In an environment at 23° C. and 50% RH, the adhesive face of the test piece is press-bonded to a stainless steel plate to obtain a measurement sample. The press-bonding is carried out by rolling a 2 kg roller back and forth once. The measurement sample is vertically suspended and left in an environment at 60° C. and 50% RH for 30 minutes. Subsequently, a 1 kg weight is attached to the free lower end of the test piece to start the test. The test is carried out for one hour and the distance that the test piece displaced (the displacement) is measured at one hour. The same measurement method is employed in the working examples described later.

The PSA sheet disclosed herein preferably has a tensile modulus per unit width in a prescribed range. In particular, the tensile modulus is preferably greater than 1000 N/cm, more preferably greater than 1400 N/cm, yet more preferably greater than 1800 N/cm, or particularly preferably greater than 2200 N/cm. The PSA sheet having such a tensile modulus has suitable rigidity and is less susceptible to creasing. It tends to provide excellent handling properties as well. The tensile modulus is preferably less than 3500 N/cm, more preferably less than 3000 N/cm, or yet more preferably less than 2800 N/cm (e.g. less than 2600 N/cm). The PSA sheet having such a tensile modulus has good adherent conformability and can well conform in a bent state to an area of the adherend including a corner.

The tensile modulus per unit width of PSA sheet is determined as follows: In particular, the PSA sheet is cut to a 10 mm wide, 50 mm long strip to prepare a test piece. The two ends of the length of the test piece are clamped with chucks in a tensile tester. In an atmosphere at 23° C., at an inter-chuck distance of 20 mm, at a speed of 50 mm/min, a tensile test is conducted using the tensile tester to obtain a stress-strain curve. Based on the initial slope of the resulting stress-strain curve, the Young's modulus (N/mm$^2$=MPa) is determined by linear regression of the curve between two specified strain points ε1 and ε2. From the product of the resulting value and the thickness of the PSA sheet, the tensile modulus per unit width (N/cm) can be determined. As the tensile tester, a commonly known or conventionally used product can be used. For instance, AUTOGRAPH AG-IS available from Shimadzu Corporation or a comparable product can be used.

<Applications>

The PSA sheet disclosed herein has excellent moisture resistance with reduced gas emission; and therefore, it is preferably used in various applications where entry of moisture and gas is desirably limited. For instance, the PSA sheet disclosed herein is preferably used fir various electronic devices. More specifically, it is preferably used as a sealing material (e.g. a sealing material to seal its internal space) in the electronic devices. In a preferable embodiment, for instance, the PSA sheet is preferably used for sealing the internal space of a magnetic disc device such as HDD. In this application, an included gas such as siloxane gas may cause damage to the device; and therefore, it is important to prevent such gas contamination. In a magnetic disc device employing HAMR, it is important to prevent entrance of water which badly affects the recording life. By using the PSA sheet disclosed herein as a sealing material (or a cover seal) for a HAMR magnetic disc device, a magnetic recording device having a higher density can be obtained.

FIG. 4 shows an embodiment of the magnetic disc device as a favorable example to which the art disclosed herein can be applied. FIG. 4 shows a cross-sectional diagram schematically illustrating the magnetic disc device according to an embodiment. A magnetic disc device 100 comprises a data-recording magnetic disc 110, a spindle motor 112 that rotates magnetic disc 110, a magnetic head 114 that reads and writes data on magnetic disc 110, and an actuator 116 that supplies power to magnetic head 114. Actuator 116 has a built-in linear motor not shown in the drawing. In this example of constitution, two magnetic discs 110 are included, but it is not limited to this and three or more magnetic discs may be included.

These components of magnetic disc device 100 are placed in a housing 120 which serves as a casing for magnetic disc device 100. In particular, the components of magnetic disc device 100 are contained in a box-shaped housing base member (a support structure) 122 having a top opening and the top opening of housing base member 122 is covered with a rigid cover member 124. More specifically, the top opening of housing base member 122 has a recessed portion around the inner circumference and the outer rim of cover member 124 is placed on the bottom of recessed portion 126, with cover member 124 covering the opening. A PSA sheet 101 is applied from the top face of cover member 124 so as to entirely cover the cover member 124 and the top face (outer circumference of the opening) of housing 120, that is, the entire top face of housing 120, altogether. This seals a space 140 present between housing base member 122 and cover member 124 as well as other holes and void spaces that communicate from the inside to the outside of magnetic disc device 100, thereby keeping the inside of the device airtight. Such a sealing structure using PSA sheet 101 as the sealing material (cover seal) can be made thinner than a conventional counterpart that uses a cover member and a gasket to obtain air-tight properties. In addition, because it does not require the use of a liquid gasket, outgassing from the gasket can be eliminated as well. In this embodiment, the width of the top rim (face of the frame) of housing base member 122 is about 0.1 mm to 5 mm (e.g. 3 mm or less, or even 2 mm or less) at its narrowest portion, with the width being the distance between the outer circumference and inner circumference of the top rim of housing base member 122. When PSA sheet 101 is applied as a cover seal to the top face of housing base member 122, the top rim of housing base member 122 provides a bonding surface to PSA sheet 101, forming a portion that isolates the internal space of magnetic disc device 100 from the outside. According to the art disclosed herein, even in an application where the width of bonding surface (through-bonding-plane permeation distance) is limited, the internal space can be maintained air tightly and dry (moisture-resistant).

FIG. 5 shows another embodiment of the magnetic disc device to which the art disclosed herein can be applied. A magnetic disc device 200 has basically the same constitution as the embodiment described above except for the way a PSA sheet 201 is applied. Different features are described below. In magnetic disc device 200, PSA sheet 201 covers cover member 224 and the top face (outer circumference of the opening) of housing base member 222 altogether, having a margin (or an extending portion) that further extends to the side of housing 220. In particular, the extending portion is bent from the top face over the corner of top rim to the side of housing base member 222. The extending portion may be provided entirely or partially at each side forming the outer circumference of the top face of housing 220. In other words, in magnetic disc device 200, PSA sheet 201 is applied, at least partially covering the top and side faces of housing 220 in a U shape. Similar to PSA sheet 101 according to the embodiment described above, PSA sheet 201 seals a space 240 present between housing base member 222 and cover member 224 as well as other holes and void spaces that communicate from the inside to the outside of magnetic disc device 200; and because it is applied with a margin extending to the side of housing base member 222, the sealed state is extended in the in-plane direction of bonding area. This results in a larger distance (width) of the bonding area of PSA sheet 201 separating the outside and space 240, etc., and it inhibits moisture permeation via the bonding area of PSA sheet 201, thereby further enhancing the moisture resistance. In this embodiment, the distance of PSA sheet 201 extending from the top rim (top edge of the side) to the side of housing 220 (i.e. the length of PSA sheet 201 that covers the side (lateral surface)) is about 1 mm or greater (e.g. 2 mm or greater, or even 3 mm or greater).

In these embodiments, cover members 124 and 224 cover magnetic discs 110 and 210 as well as actuators 116 and 216 altogether, respectively, in one piece. However, they are not limited to these. They may cover magnetic discs 110 and 210, actuators 116 and 216, and other components, separately; or they may not cover actuators 116 or 216 while covering magnetic discs 110 and 210. Even in these embodiments, by applying the PSA sheet over the cover member, the inside of the device can be made moisture-resistant and air-tight. In a magnetic disc device having such an embodiment, the moisture resistance and air-tight properties are obtained with the thin PSA sheet, thereby achieving a thin sealing structure. This can increase the capacity for housing magnetic discs, bringing about a magnetic disc device having a higher density and a larger capacity.

Matters disclosed by this description include the following:

(1) A magnetic disc device comprising
at least one data-recording magnetic disc,
a motor that rotates the magnetic disc,
a magnetic head that at least either reads or writes data on the magnetic disc,
an actuator that moves the magnetic head, and
a housing that houses the magnetic disc, the motor, the magnetic head and the actuator; wherein
the housing is provided with a cover seal, the cover seal being a PSA sheet comprising a moisture-impermeable layer and a PSA layer provided to one face of the moisture-impermeable layer, and
the PSA layer comprises a polymer A having a weight average molecular weight of $5 \times 10^4$ or higher as a base polymer and a polymer B having a number average molecular weight of 1000 or higher and a weight average molecular weight lower than $5 \times 10^4$.

(2) The magnetic disc device according to (1) above, wherein the housing comprises a box-shaped housing base member having a top opening and a cover member to cover the opening.

(3) The magnetic disc device according to (2) above, wherein the housing base member has a recessed portion around the inner circumference of the top opening and the outer rim of the cover member is placed on the bottom of the recessed portion.

(4) The magnetic disc device according to any of (1) to (3) above, wherein the cover member has a hole.

(5) The magnetic disc device according to any of (1) to (4) above, wherein e PSA sheet seals the internal space of the magnetic disc device.

(6) The magnetic disc device according to any of (1) to (5) above, wherein the PSA sheet covers and seals the top face of the housing base member of the magnetic disc device.

(7) The magnetic disc device according to any of (1) to (6) above, capable of heat-assisted magnetic recording.

(8) A PSA sheet comprising a moisture-impermeable layer and a PSA layer provided to one face of the moisture-impermeable layer, wherein
the PSA layer comprises a polymer A having a weight average molecular weight of $5 \times 10^4$ or higher as a base polymer and a polymer B having a number average molecular weight of 1000 or higher and a weight average molecular weight lower than $5 \times 10^4$.

(9) The PSA sheet according to (8) above, wherein the number average molecular weight of the polymer B is 2000 or higher.

(10) The PSA sheet according to (8) or (9) above, wherein the polymer B is at least one species selected among olefinic polymers and diene-based polymers.

(11) The PSA sheet according to any of (8) to (10) above, wherein the polymer B is a polybutene.

(12) The PSA sheet according to any of (8) to (11) above, wherein the polymer A is at least one species selected among rubber-based polymers and acrylic polymers.

(13) The PSA sheet according to any of (8) to (12) above, having a moisture permeability lower than 30 $\mu g/cm^2 \cdot 24$ h in in-plane directions of bonding area of PSA sheet, determined at a permeation distance of 2.5 mm based on the MOCON method.

(14) The PSA sheet according to any of (8) to (13) above, having an amount of thermally released gas of 10 $\mu g/cm^2$ or less, determined at 130° C. for 30 minutes by gas chromatography/mass spectrometry.

(15) The PSA sheet according to any of (8) to (14) above, used for sealing the internal space of a magnetic disc device.

(16) A release liner-supported PSA sheet comprising the PSA sheet according to any of (8) to (15) above and a release liner protecting the adhesive face of the PSA sheet, wherein the release liner is a non-silicone-based release liner free of a silicone-based release agent.

(17) A magnetic disc device comprising the PSA sheet according to any of (8) to (14) above.

(18) The magnetic disc device according to (17) above, wherein the PSA sheet seals the internal space of the magnetic disc device.

(19) The magnetic disc device according to (17) or (18) above, wherein the magnetic disc device has a housing base member and the PSA sheet is a cover seal that covers and seals the top face of the housing base member.

(20) The magnetic disc device according to any of (17) to (19) above, capable of heat-assisted magnetic recording.

EXAMPLES

Several working examples related to the present, invention are described below, but the present invention is not intended to be limited to these examples. In the description below, "parts" and "%" are by weight unless otherwise specified.

Example 1

(Preparation of Moisture-Impermeable Layer)

By dry bonding lamination, were laminated 25 μm thick PET film (PET layer) as the first resin layer, 7 μm thick aluminum foil (Al layer) as the inorganic layer and 9 μm thick PET film (PET layer) as the second resin layer in this order from the front (outer surface side) to the backside (PSA layer side). Between each resin layer and the inorganic layer, was laminated a 3 μm thick adhesive layer. A 47 μm thick moisture-impermeable layer was thus prepared.

(Preparation of PSA Composition)

In toluene, were dissolved 50 parts of butyl rubber (IIR: butyl rubber available from JSR, product name JSR BUTYL 268, Mw~$54 \times 10^4$, Mw/Mn~4.5) as the base polymer and polybutene (NISSEKI POLYBUTENE HV-1900 available from JXTG Nippon Oil & Energy Corporation, Mn 2900) to prepare a PSA composition with 25% NV.

(Fabrication of PSA Sheet)

The PSA composition obtained above was applied to one face (the second resin layer-side surface) of the moisture-impermeable layer to have a thickness of 30 μm after dried, and allowed to dry at 120° C. for 3 minutes to form a PSA layer. A PSA sheet was thus obtained according to this Example. For protection of the surface (adhesive face) of the PSA layer, was used a release liner formed of thermoplastic film treated with release agent (product name HP-S0 available from Fujico Co. Ltd.; 50 μm thick).

Examples 2, 3 and Reference Example

In place of the polybutene in Example 1, were used NISSEKI POLYBUTENE HV-300 (Mn 1400) in Example 2 and NISSEKI POLYBUTENE HV-15 (Mn 630) in Example 3, both available from JXTG Nippon Oil & Energy Corporation. Otherwise in the same manner as Example 1, were obtained PSA sheets according to Examples 2 and 3. Without using the polybutene, but otherwise basically in the same manner as Example 1, was obtained a PSA sheet according to Reference Example.

[Moisture Permeability (Cup Method) of PSA Layer]

The moisture permeability in the thickness direction of each PSA layer was determined based on the water vapor permeability test (cup method) in JIS Z 0208. In particular the PSA composition was applied to a releasable surface and allowed to dry to form a 50 μm thick PSA layer. The PSA layer was adhered to 2 μm thick PET film (DIAFOIL available from Mitsubishi Plastics, Inc.) with rubber roller. The PET layer-supported PSA layer was cut to a circle of 30 mm diameter to fit the diameter of the test cup (an aluminum cup of 30 mm diameter used in the cup method of JIS Z 0208). This was used as a test sample. A prescribed amount of calcium chloride was placed in the cup and the opening of the cup was sealed with the test sample prepared above. The cup covered with the test sample was placed in a thermostat wet chamber at 60° C. and 90% RH and left standing for 24 hours. The change in weight of calcium chloride before and after this step was determined to obtain the moisture permeability (g/cm²·24 h).

For each Example, Table 1 shows the species of PSA as well as the test results of moisture permeability (cup method) (g/cm²·24 h), storage moduli G'(25° C.) (MPa), through-bonding-plane moisture permeability of PSA sheet (μg/cm²·24 h), adhesive strength (N/20 mm), shear holding power (mm) and amount of thermally released gas (μg/cm²).

[Table 1]

TABLE 1

|  |  | Ex. 1 | Ex. 2 | Ex. 3 | Ref. Ex. |
|---|---|---|---|---|---|
| PSA Composition | Polymer A | IIR | IIR | IIR | IIR |
|  | Polymer B | HV-1900 | HV-300 | HV-15 | — |
|  | Mn | 2900 | 1400 | 630 | — |
|  | Blend ratio(A/B) | 50/50 | 50/50 | 50/50 | 100 |
| G'(25° C.) of PSA layer (Mpa) |  | 0.2 | 0.15 | 0.1 | 0.3 |
| Moisture permeability (cup method) (g/cm² · 24 hr) |  | 1.3 | 1.3 | 1.3 | 1.3 |
| Moisture permeability in in-plane directions of bonding area (μg/cm² · 24 h) |  | 17.4 | 24.3 | 87.0 | 30 |
| Adhesive strength (N/20 mm) |  | 7.8 | 7.2 | 4.9 | 2.6 |
| Shear holding power (mm) |  | 1.6 | 3.2 | falling | 0.2 |
| Amount of thermally released gas (μg/cm²) |  | 0.9 | 2.2 | 10.5 | 0.8 |

As shown in Table 1, as compared to Reference Example not using a polymer B, Examples 1 and 2 showed lower moisture permeation in in-plane directions of bonding area, with both Examples using a PSA layer comprising a high-molecular-weight polymer A as a base polymer and a low-molecular-weight polymer B with Mn≥1000. On the other hand, in Example 3 using a polymer B with Mn<1000, the moisture resistance did not improve. The PSA sheet of Example 3 failed the shear holding power test and fell off during the test. On the other hand, in Examples 1 and 2, the displacement in the shear holding power test was at or below the prescribed value, showing good holding power. The PSA sheets according to Examples 1 and 2 tended to thermally release less gas than the PSA sheet of Example 3. Especially, Example 1 using a polymer B with Mn≥2000 performed best in all tests (through-bonding-plane moisture permeability adhesive strength, shear holding power, and amount of thermally released gas) among the examples tested (Examples 1 to 3). It is noted that in the evaluation of adhesive strength, Example 3 showed leftover adhesive residue after peeled off.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 101, 201 PSA sheets
10 moisture-impermeable layer
12 resin layer
14 inorganic layer
16 second resin layer
20 PSA layer
50 moisture permeability tester
52 wet chamber
54 dry chamber
56 metal plate
58 opening (in metal plate)
60 measurement sample
100, 200 magnetic disc devices
110, 210 magnetic discs
112, 212 spindle motors
114, 214 magnetic heads
116, 216 actuator
120, 220 housing
122, 222 housing base member
124, 224 cover member
120, 220 recessed portions
140, 240 spaces

What is claimed is:

1. A magnetic disc device comprising
at least one data-recording magnetic disc,
a motor that rotates the magnetic disc,
a magnetic head that at least either reads or writes data on the magnetic disc,
an actuator that moves the magnetic head, and
a housing that houses the magnetic disc, the motor, the magnetic head and the actuator; wherein
the housing is provided with a cover seal,
the cover seal is a pressure-sensitive adhesive sheet comprising:
a moisture-impermeable layer; and
a pressure-sensitive adhesive layer provided to one face of the moisture-impermeable layer, wherein the pressure-sensitive adhesive layer comprises:

a polymer A having a weight average molecular weight of $5\times10^4$ or higher and $300\times10^4$ or lower as a base polymer; and a polymer B having a number average molecular weight of 1000 or higher and a weight average molecular weight lower than $5\times10^4$, and the cover seal has an amount of thermally release gas of 10 µg/cm$^2$ or less, determined at 130° C. for 30 minutes by gas chromatography/mass spectrometry.

2. The magnetic disc device according to claim 1, wherein the housing comprises a box-shaped housing base member having a top opening and a cover member to cover the opening.

3. The magnetic disc device according to claim 2, wherein the housing base member has a recessed portion inner-circumferentially around the top opening and the cover member has an outer rim placed on the bottom of the recessed portion.

4. The magnetic disc device according to claim 1, wherein the cover member has a hole.

5. The magnetic disc device according to claim 1, wherein the pressure-sensitive adhesive sheet seals the internal space of the magnetic disc device.

6. The magnetic disc device according to claim 1, wherein the pressure-sensitive adhesive sheet covers and seals the top face of the housing base member of the magnetic disc device.

7. The magnetic disc device according to claim 1, capable of heat-assisted magnetic recording.

8. A pressure-sensitive adhesive sheet comprising:
a moisture-impermeable layer; and
a pressure-sensitive adhesive layer provided to one face of the moisture-impermeable layer, wherein the pressure-sensitive adhesive layer comprises:
  a polymer A having a weight average molecular weight of $5\times10^4$ or higher as a base polymer and $300\times10^4$ or lower; and
  a polymer B having a number average molecular weight of 1000 or higher and a weight average molecular weight lower than $5\times10^4$,
wherein the pressure-sensitive adhesive sheet has an amount of thermally release gas of 10 µg/cm$^2$ or less, determined at 130° C. for 30 minutes by gas chromatography/mass spectrometry.

9. The pressure-sensitive adhesive sheet according to claim 8, wherein the number average molecular weight of the polymer B is 2000 or higher.

10. The pressure-sensitive adhesive sheet according to claim 8, wherein the polymer B is at least one species selected among olefinic polymers and diene-based polymers.

11. The pressure-sensitive adhesive sheet according to claim 8, wherein the polymer B is a polybutene.

12. The pressure-sensitive adhesive sheet according to claim 8, wherein the polymer A is at least one species selected among rubber-based polymers and acrylic polymers.

13. The pressure-sensitive adhesive sheet according to claim 8, having a moisture permeability lower than 30 µg/cm$^2$·24 h in the in-plane direction of bonding area of pressure-sensitive adhesive sheet, determined at a permeation distance of 2.5 mm based on the MOCON method.

14. The pressure-sensitive adhesive sheet according to claim 8, used for sealing the internal space of a magnetic disc device.

15. A release liner-supported pressure-sensitive adhesive sheet comprising the pressure-sensitive adhesive sheet according to claim 8 and a release liner protecting the adhesive face of the pressure-sensitive adhesive sheet, wherein the release liner is a non-silicone-based release liner free of a silicone-based release agent.

16. A magnetic disc device comprising the pressure-sensitive adhesive sheet according to claim 8.

17. The magnetic disc device according to claim 16, wherein the pressure-sensitive adhesive sheet seals the internal space of the magnetic disc device.

18. The magnetic disc device according to claim 16, wherein the magnetic disc device has a housing base member and the pressure-sensitive adhesive sheet is a cover seal that covers and seals the top face of the housing base member.

19. The magnetic disc device according to claim 16, capable of heat-assisted magnetic recording.

\* \* \* \* \*